(12) United States Patent
Ihara et al.

(10) Patent No.: US 7,645,544 B2
(45) Date of Patent: Jan. 12, 2010

(54) ELECTROLYTE, BATTERY INCLUDING ELECTROLYTE, AND METHOD FOR MANUFACTURING ELECTROLYTE

(75) Inventors: Masayuki Ihara, Fukushima (JP); Hiroyuki Yamaguchi, Fukushima (JP); Tadahiko Kubota, Kanagawa (JP); Toru Odani, Fukushima (JP)

(73) Assignee: Sony Corporation, Tokyo (JP)

( * ) Notice: Subject to any disclaimer, the term of this patent is extended or adjusted under 35 U.S.C. 154(b) by 44 days.

(21) Appl. No.: 11/758,577

(22) Filed: Jun. 5, 2007

(65) Prior Publication Data

US 2008/0090154 A1   Apr. 17, 2008

(30) Foreign Application Priority Data

Jun. 5, 2006   (JP)  ............... P2006-156639
Oct. 3, 2006   (JP)  ............... P2006-272107

(51) Int. Cl.
    *H01M 10/40*   (2006.01)
(52) U.S. Cl. ............... 429/340; 429/338; 429/188
(58) Field of Classification Search ............... None
    See application file for complete search history.

(56) References Cited

U.S. PATENT DOCUMENTS

| 2005/0095503 A1* | 5/2005 | Adachi et al. ............... 429/188 |
| 2005/0118512 A1* | 6/2005 | Onuki et al. ............... 429/326 |
| 2005/0214646 A1* | 9/2005 | Kubota ............... 429/231.95 |

FOREIGN PATENT DOCUMENTS

| JP | 2001185215 A | * | 7/2001 |
| JP | 3294400 | | 4/2002 |
| JP | 2002270233 A | * | 9/2002 |
| JP | 2004319317 A | * | 11/2004 |
| KR | 2006056780 A | * | 5/2006 |
| WO | WO 2005013400 A2 | * | 2/2005 |

OTHER PUBLICATIONS

Cao, Y et al., "Electrochemical Partial Fluorination of Organic Compounds 82: Anodic α-Fluorination Five-Membered Cyclic Thiocarbonates," Department of Electronic Chemistry, pp. 2477-2483 (2005).

* cited by examiner

*Primary Examiner*—Dah-Wei D Yuan
*Assistant Examiner*—Edu E Enin-Okut
(74) *Attorney, Agent, or Firm*—K&L Gates LLP

(57) ABSTRACT

An electrolyte capable of improving battery characteristics even at high temperatures, a battery including the electrolyte, and a method for manufacturing an electrolyte are provided. The electrolyte contains at least one type of compound represented by the following formula:

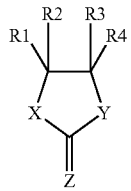

where R1, R2, R3, and R4 independently represent a hydrogen group, a fluorine group, a methyl group, an ethyl group, or a group in which a fluorine group has substituted for a part of the methyl group or the ethyl group; at least one of R1, R2, R3, and R4 is a group containing fluorine (F); and X, Y, and Z independently represents sulfur (S) or oxygen (O) except the case in which all of X, Y, and Z are oxygen (O), that is, X=Y=Z=O.

22 Claims, 4 Drawing Sheets

ELECTROLYTE, BATTERY INCLUDING ELECTROLYTE, AND METHOD FOR MANUFACTURING ELECTROLYTE

CROSS REFERENCES TO RELATED APPLICATIONS

The present application claims priority to Japanese Patent Application JP 2006-272107 filed in the Japanese Patent Office on Oct. 3, 2006, and Japanese Patent Application JP 2006-156639, filed on Jun. 5, 2006, the entire contents of which are incorporated herein by reference.

BACKGROUND

The present application relates to an electrolyte, a battery including the electrolyte, and a method for manufacturing an electrolyte. In particular, it relates to a nonaqueous electrolyte including a nonaqueous solvent and an electrolyte salt, a nonaqueous electrolyte battery including the nonaqueous electrolyte, and a method for manufacturing a nonaqueous electrolyte.

In recent years, camcorders (camera-equipped video tape recorders), cellular phones, and portable electronic apparatuses represented by laptop computers have become widespread, and requirements for miniaturization, weight reduction, and long-duration continuous driving thereof have become intensified. Consequently, researches on the improvement of the energy density of batteries, in particular secondary batteries, have been pursued actively. Most of all, expectations for a lithium ion secondary battery or a lithium metal secondary battery are rising because a large energy density is obtained as compared with that of a lead battery and a nickel cadmium battery which are known nonaqueous electrolytic solution secondary batteries.

In such a lithium ion secondary battery or a lithium metal secondary battery, an electrolyte in which $LiPF_6$ serving as an electrolyte salt is dissolved in a carbonic acid ester based nonaqueous solvent, e.g., propylene carbonate or diethyl carbonate, has been used widely because the electrical conductivity is high and the potential is stable (refer to, for example, Japanese Patent No. 3294400).

SUMMARY

However, as the use of the portable electronic apparatuses is increased, occasions where the apparatuses are placed under high temperature conditions during transportation, use, or the like are increased recently. Consequently, deterioration of battery characteristics causes problems. Therefore, development of an electrolyte or a battery capable of exhibiting excellent characteristics not only at room temperature, but also at high temperatures has been required.

Accordingly, it is desirable to provide an electrolyte capable of improving battery characteristics even at high temperatures, a battery including the electrolyte, and a method for manufacturing an electrolyte.

According to an embodiment, an electrolyte is provided, the electrolyte containing at least one type of compound represented by Chemical formula 1:

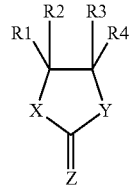

Chemical formula 1 where R1, R2, R3, and R4 independently represent a hydrogen group, a fluorine group, a methyl group, an ethyl group, or a group in which a fluorine group has substituted for a part of the methyl group or the ethyl group; at least one of R1, R2, R3, and R4 is a group containing fluorine (F); and X, Y, and Z independently represent sulfur (S) or oxygen (O) except the case in which all of X, Y, and Z are oxygen (O), that is, X=Y=Z=O.

According to an embodiment, a battery is provided, the battery including a positive electrode, a negative electrode, and an electrolyte, wherein the electrolyte contains at least one type of compound represented by Chemical formula 2:

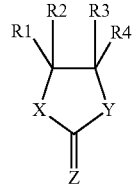

Chemical formula 2 where R1, R2, R3, and R4 independently represent a hydrogen group, a fluorine group, a methyl group, an ethyl group, or a group in which a fluorine group has substituted for a part of the methyl group or the ethyl group; at least one of R1, R2, R3, and R4 is a group containing fluorine (F); and X, Y, and Z independently represent sulfur (S) or oxygen (O) except the case in which all of X, Y, and Z are oxygen (O), that is, X=Y=Z=O.

According to an embodiment, a method for manufacturing an electrolyte is provided, the method including the step of bringing a compound represented by Chemical formula 3 and a fluorine gas into contact with each other in a solvent inert to the fluorine gas so as to prepare a compound represented by Chemical formula 4 and a compound represented by Chemical formula 5, and producing an electrolyte containing at least one type of compound selected from the compounds represented by Chemical formula 4 and Chemical formula 5:

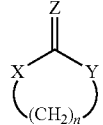

Chemical formula 3 where X, Y, and Z independently represent sulfur (S) or oxygen (O); at least one of X, Y, and Z is sulfur (S); and n represents an integer of 2 or more,

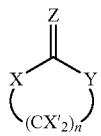

Chemical formula 4 where X, Y, and Z are the same as X, Y, and Z in Chemical formula 3; n is the same as n in Chemical formula 3; and X' is hydrogen (H) or fluorine (F) and contains at least one fluorine (F),

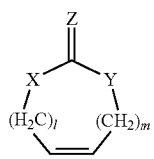

Chemical formula 5 where X, Y, and Z are the same as X, Y, and Z in Chemical formula 3; l and m independently represent an integer of 0 or more and satisfy the relationship indicated by n=l+m+2; and n is the same as n in Chemical formula 3.

Since the electrolyte according to an embodiment contains at least one type of compound represented by Chemical formula 1, the chemical stability may be improved even in high temperature environments.

Since the battery according to an embodiment includes the electrolyte containing at least one type of compound represented by Chemical formula 2, a decomposition reaction of the electrolyte at a negative electrode may be reduced even in high temperature environments and, therefore, excellent characteristics may be exhibited even at high temperatures.

According to an embodiment, fluorinated thiocarbonate and unsaturated thiocarbonate may be produced simply and efficiently by bringing a compound represented by Chemical formula 3 and a fluorine gas into contact with each other in a solvent inert to the fluorine gas so as to produce them.

The chemical stability may be improved even at high temperatures by the electrolyte according to an embodiment. Furthermore, excellent characteristics may be exhibited even at high temperatures by the battery, which includes the above-described electrolyte, according to an embodiment.

Additional features and advantages are described herein, and will be apparent from, the following Detailed Description and the figures.

DETAILED DESCRIPTION

Figure 1:
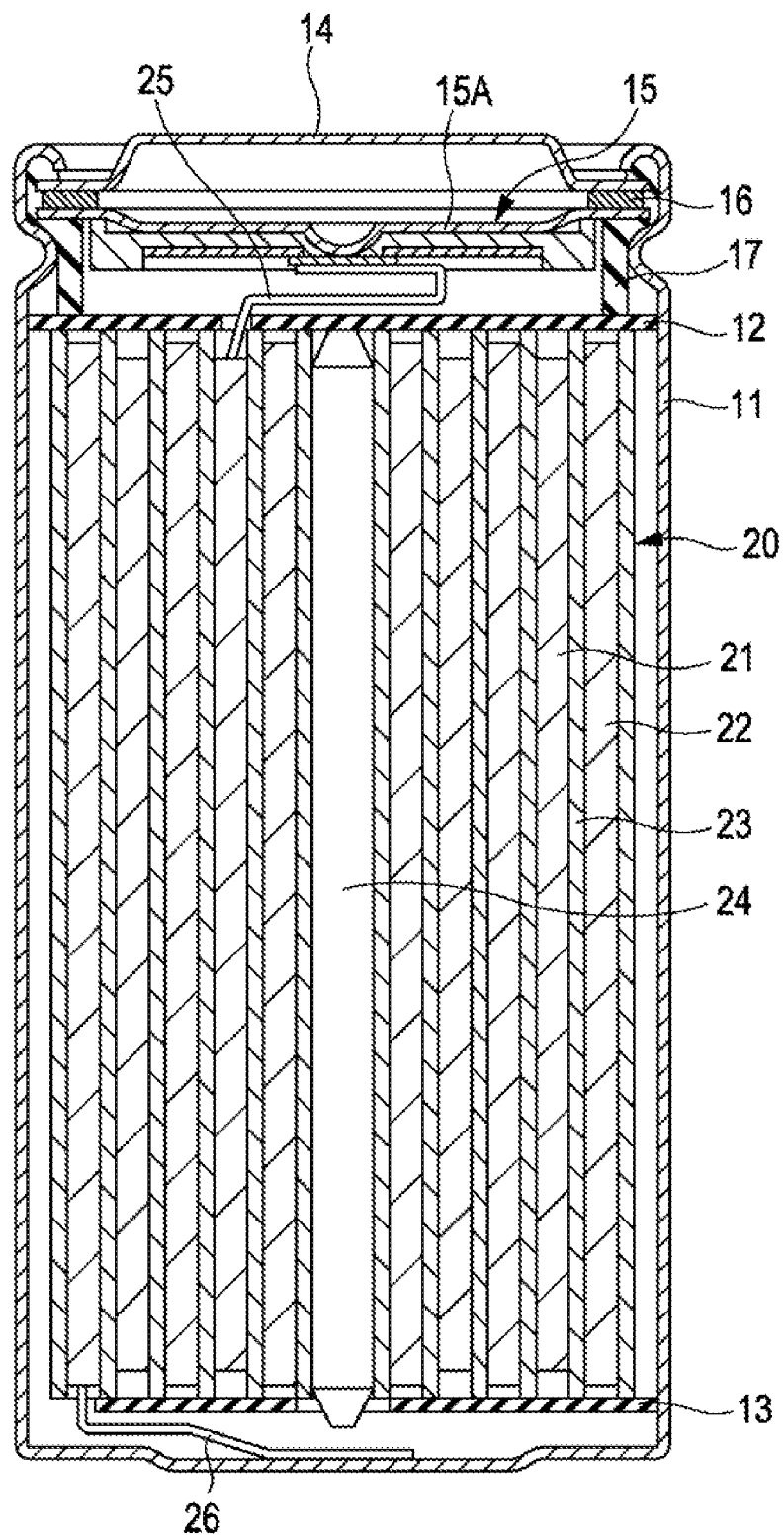
FIG. 1 is a sectional view showing the configuration of a first example of a secondary battery including an electrolyte according to an embodiment.

The embodiments according to the present application will be described below in detail with reference to the drawings. An electrolyte according to an embodiment includes a so-called liquid electrolytic solution containing, for example, a solvent and an electrolyte salt dissolved in the solvent. It is preferable that the solvent is a nonaqueous solvent, e.g., an organic solvent, containing a compound represented by Chemical formula 6.

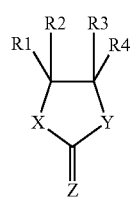

Chemical formula 6 where R1, R2, R3, and R4 independently represent a hydrogen group, a fluorine group, a methyl group, an ethyl group, or a group in which a fluorine group has substituted for a part of the methyl group or the ethyl group; at least one of R1, R2, R3, and R4 is a group containing fluorine (F); and X, Y, and Z independently represent sulfur (S) or oxygen (O) except the case in which all of X, Y, and Z are oxygen (O), that is, X=Y=Z=O.

Since the solvent contains a compound represented by Chemical formula 6, a decomposition reaction and the like of the electrolytic solution may be suppressed even at high temperatures. Therefore, when the solvent is used in a battery, the cycle characteristic may be improved even at high temperatures and, in addition, high-temperature preservation characteristic may also be improved. Consequently, even when a battery including this solvent is stood under high temperature conditions or is used under high temperature conditions, excellent characteristics may be exhibited.

In the case where the negative electrode includes a carbon material, in particular, the ambient temperature cycle characteristic may also be improved. Likewise, in the case where the negative electrode includes a material containing silicon (S) as a constituent element, the ambient temperature cycle characteristic may also be improved.

Specific examples of compounds represented by Chemical formula 6 may include the compounds represented by (7-1) to (7-52) of Chemical formula 7.

Chemical formula 7

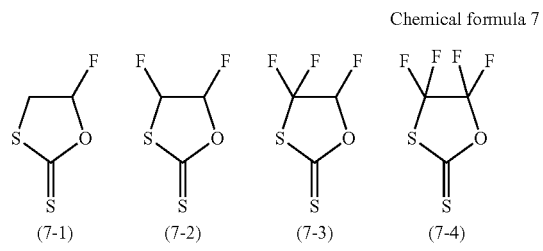

(7-1)　　(7-2)　　(7-3)　　(7-4)

-continued

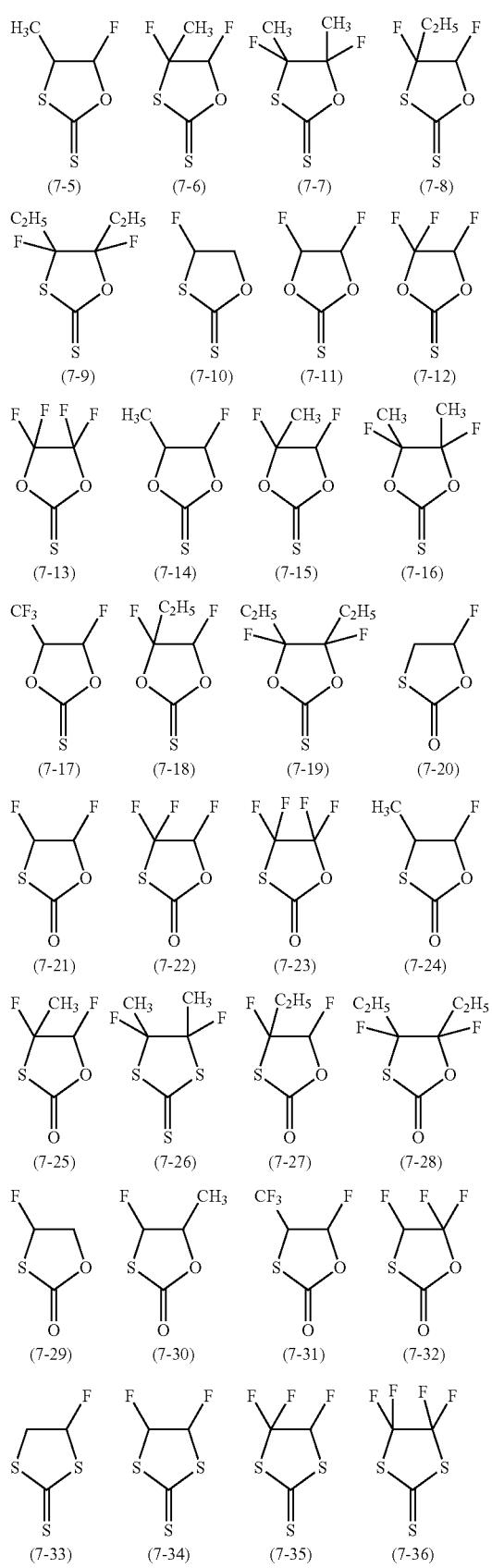

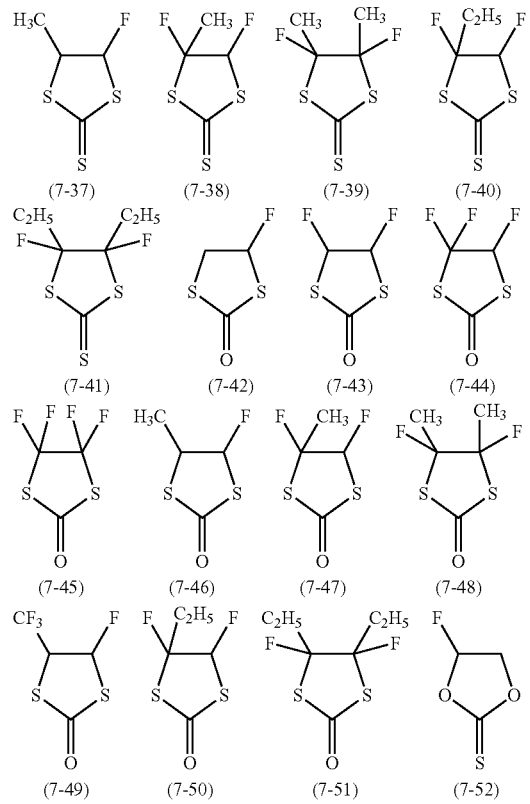

Among the compounds represented by Chemical formula 6, the compounds represented by Chemical formula 8 are preferable because further excellent high temperature characteristics may be exhibited.

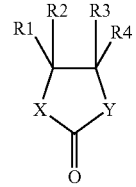

Chemical formula 8 where R1, R2, R3, and R4 independently represent a hydrogen group, a fluorine group, a methyl group, an ethyl group, or a group in which a fluorine group has substituted for a part of the methyl group or the ethyl group; at least one of R1, R2, R3, and R4 is a group containing fluorine (F); and X and Y independently represent sulfur (S) or oxygen (O) except the case in which both X and Y are oxygen (O), that is, X=Y=O.

Preferably, the content of the compound represented by Chemical formula 6 is 0.01 percent by weight or more, and less than 5 percent by weight relative to the solvent on the ground that further excellent high temperature characteristics may be exhibited.

Preferably, the solvent further contains a cyclic carbonic acid ester, e.g., vinylene carbonate (VC) or vinylethylene carbonate (VEC), having an unsaturated bond. This is because the chemical stability of the electrolytic solution may be improved and further excellent high temperature characteristics may be exhibited. Furthermore, it is preferable that the content of the cyclic carbonic acid ester having an unsaturated bond is 0.01 percent by weight or more, and 5 percent by weight or less. This is because particularly excellent high temperature characteristics may be exhibited.

Preferably, the solvent further contains a cyclic sultone derivative. This is because further excellent high temperature characteristics may be exhibited. Examples of cyclic sultone derivatives include propane sultone and propene sultone. It is more preferable that the content of the cyclic sultone derivative is within the range of 0.5 percent by weight to 3 percent by weight. This is because particularly excellent high temperature characteristics may be exhibited.

Preferably, the solvent further contains an acid anhydride. This is because further excellent high temperature characteristics may be exhibited. Examples of acid anhydrides include succinic anhydride, glutaric anhydride, and maleic anhydride. It is preferable that the content of the acid anhydride is within the range of 0.5 percent by weight to 3 percent by weight. This is because particularly excellent high temperature characteristics may be exhibited.

Furthermore, it is preferable that the solvent further contains a halogenated cyclic carbonic acid ester represented by Chemical formula 10 corresponding to a cyclic carbonic acid ester represented by Chemical formula 9 in which the fluorine (F) atom, the chlorine (Cl) atom, or the bromine (Br) atom has substituted for at least a part of hydrogen atoms in R1, R2, R3, and R4. This is because a decomposition reaction and the like of the electrolytic solution may be further suppressed even at high temperatures. Therefore, for example, when this solvent is used in a battery, the cycle characteristic may be further improved and, in addition, the high-temperature preservation characteristic and the high-temperature service characteristic may be further improved. Consequently, even when a battery including this solvent is stood under high temperature conditions or is used under high temperature conditions, further excellent characteristics may be exhibited.

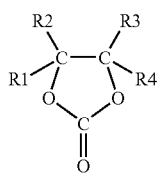

Chemical formula 9 where R1, R2, R3, and R4 independently represent a hydrogen atom, a methyl group, or an ethyl group.

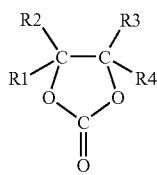

Chemical formula 10 where R1, R2, R3, and R4 independently represent a hydrogen group, a halogen group, a methyl group, an ethyl group, or a group in which a halogen group has substituted for a part of hydrogen of the methyl group or the ethyl group; and at least one of R1, R2, R3, and R4 is a group containing a halogen.

Specific examples of compounds represented by Chemical formula 10 include (11-1) to (11-23) of Chemical formula 11.

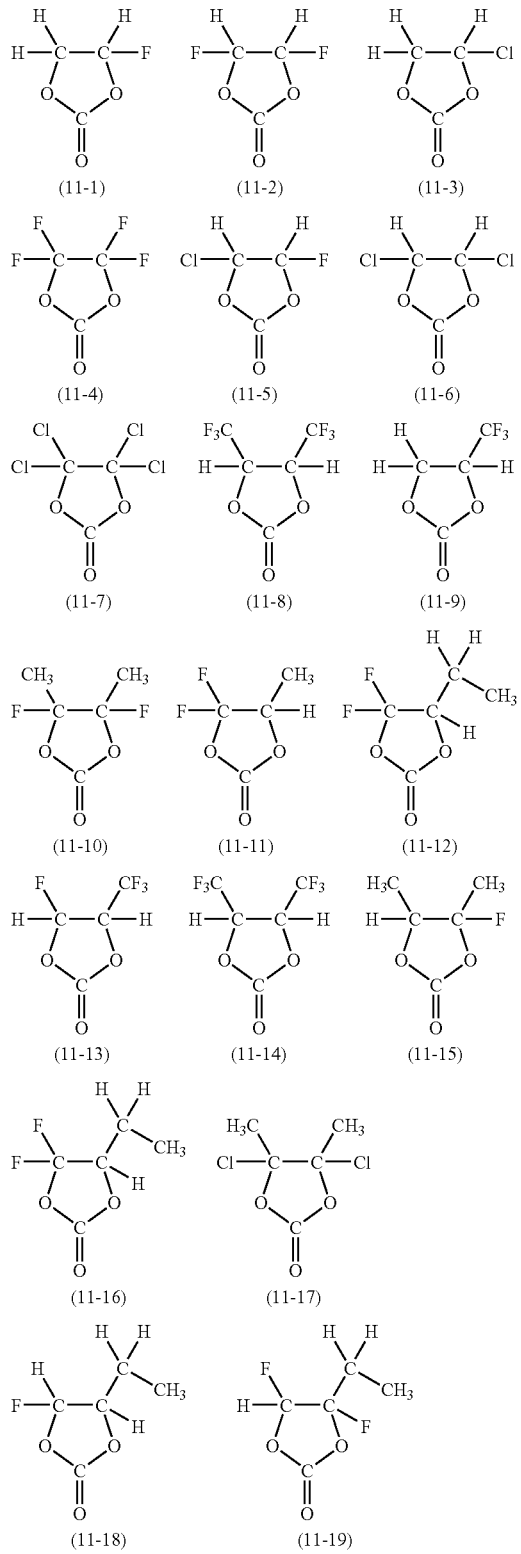

Chemical formula 11

-continued

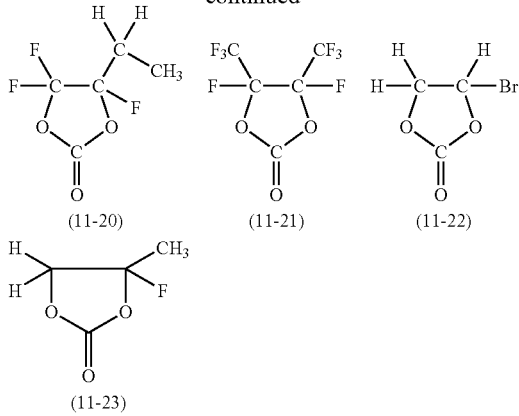

(11-20) (11-21) (11-22) (11-23)

It is preferable that the solvent contains at least one type of 4-fluoro-1,3-dioxolane-2-on represented by (11-1) of Chemical formula 11 and 4,5-difluoro-1,3-dioxolane-2-on represented by (11-2) of Chemical formula 11 among the compounds represented by Chemical formula 10. This is because further excellent high temperature characteristics may be exhibited. Moreover, it is preferable that 4,5-difluoro-1,3-dioxolane-2-on takes the trans form. This is because particularly excellent high temperature characteristics may be exhibited.

Previously used various nonaqueous solvents may be used by mixing. Such a nonaqueous solvent is not specifically limited, and specific examples thereof include ethylene carbonate, propylene carbonate, butylene carbonate, vinylene carbonate, γ-butyrolactone, γ-valerolactone, 1,2-dimethoxyethane, tetrahydrofuran, 2-methyltetrahydrofuran, 1,3-dioxolane, 4-methyl-1,3-dioxolane, methyl acetate, methyl propionate, ethyl propionate, dimethyl carbonate, ethyl methyl carbonate, diethyl carbonate, acetonitrile, glutaronitrile, adiponitrile, methoxyacetonitrile, 3-methoxypropionitrile, N,N-dimethylformamide, N-methylpyrrolidinone, N-methyloxazolidinone, N,N'-dimethylimidazolidinone, nitromethane, nitroethane, sulfolane, dimethylsulfoxide, and trimethyl phosphate. These may be used alone by mixing, or a plurality of types may be used by mixing. In the case where a plurality of types of solvents are used by mixing, it is preferable that a high dielectric constant solvent having a relative dielectric constant of 30 or more and a low viscosity solvent having a viscosity of 1 mPa·s or less are used by mixing. This is because a high ionic conductivity may be exhibited.

In order to realize further excellent charge and discharge capacity characteristic and charge and discharge cycle characteristic, it is preferable to use a solvent containing at least one type selected from the group consisting of ethylene carbonate, propylene carbonate, vinylene carbonate, dimethyl carbonate, and ethyl methyl carbonate.

Electrolyte Salt

Preferably, the electrolyte salt contains the light metal salt represented by Chemical formula 12. This is because the light metal salt represented by Chemical formula 12 forms a stable coating on the surface of the negative electrode, and the decomposition reaction of the solvent may be suppressed. One type of the light metal salt represented by Chemical formula 12 may be used alone, or at least two types may be used by mixing.

Chemical formula 12

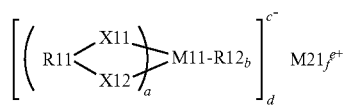

where R11 represents a group indicated by Chemical formula 13, Chemical formula 14, or Chemical formula 15; R12 represents a halogen group, an alkyl group, a halogenated alkyl group, an aryl group, or a halogenated aryl group; X11 and X12 independently represent oxygen (O) or sulfur (S); M11 represents a transition metal element or a group 3B element, group 4B element, or group 5B element in the short-period form of the periodic table; M21 represents a group 1A element or group 2A element in the short-period form of the periodic table or aluminum (Al); a represents an integer of 1 to 4; b represents an integer of 0 to 8; and c, d, e, and f independently represent an integer of 1 to 3.

Chemical formula 13

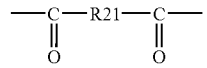

where R21 represents an alkylene group, a halogenated alkylene group, an arylene group, or a halogenated arylene group.

Chemical formula 14

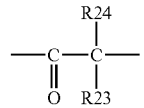

where R23 and R24 independently represent an alkyl group, a halogenated alkyl group, an aryl group, or a halogenated aryl group.

Chemical formula 15

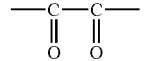

The compound represented by Chemical formula 16 is preferable as the light metal salt represented by Chemical formula 12.

Chemical formula 16

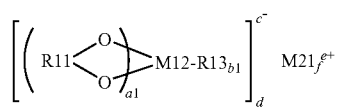

where R11 represents a group indicated by Chemical formula 17, Chemical formula 18, or Chemical formula 19; R13 represents a halogen; M12 represents phosphorous (P) or boron (B); M21 represents a group 1A element or group 2A element in the short-period form of the periodic table or aluminum (Al); a1 represents an integer of 1 to 4; b1 represents 0, 2, or 4; and c, d, e, and f independently represent an integer of 1 to 3.

Chemical formula 17

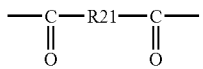

where R21 represents an alkylene group, a halogenated alkylene group, an arylene group, or a halogenated arylene group).

Chemical formula 18

Chemical formula 19

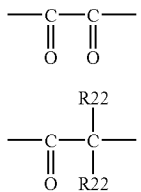

wherein R22 represents an alkyl group, a halogenated alkyl group, an aryl group, or a halogenated aryl group.

More specific examples of the light metal salts represented by Chemical formula 16 include difluoro[oxolate-O,O'] lithium borate represented by Chemical formula 20, difluorobis[oxolate-O,O']lithium phosphate represented by Chemical formula 21, difluoro[3,3,3-trifluoro-2-oxide-2-trifluoromethylpropionate(2-)-O,O']lithium borate represented by Chemical formula 22, bis[3,3,3-trifluoro-2-oxide-2-trifluoromethylpropionate(2-)-O,O']lithium borate represented by Chemical formula 23, tetrafluoro[oxolate-O,O']lithium phosphate represented by Chemical formula 24, and bis[oxolate-O,O']lithium borate represented by Chemical formula 25.

Chemical formula 20

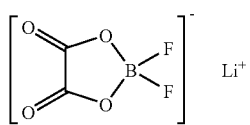

Chemical formula 21

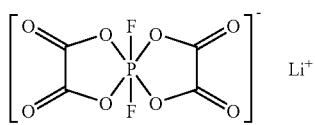

Chemical formula 22

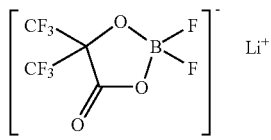

Chemical formula 23

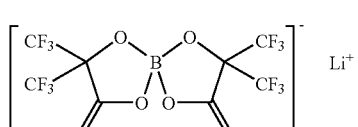

Chemical formula 24

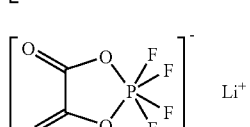

-continued

Chemical formula 25

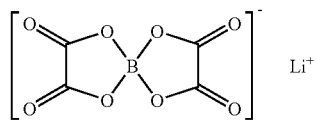

Preferably, in addition to the above-described light metal salt, at least one type of other light metal salt is used by mixing as the electrolyte salt. This is because the battery characteristics, e.g., the preservation characteristic, may be improved and the internal resistance may be reduced.

Examples of other light metal salts may include $LiB(C_6H_5)_4$, $LiCH_3SO_3$, $LiCF_3SO_3$, $LiAlCl_4$, $LiSiF_6$, $LiCl$, $LiBr$, $LiPF_6$, $LiBF_4$, $LiB(OCOCF_3)_4$, $LiB(OCOC_2F_5)_4$, $LiClO_4$, $LiAsF_6$, lithium salts, e.g., $LiN(CF_3SO_2)_2$, $LiN(C_2F_5SO_2)_2$, and $LiN(C_4F_9SO_2)(CF_3SO_2)$, represented by Chemical formula 26, and lithium salts, e.g., $LiC(CF_3SO_2)_3$, represented by Chemical formula 27.

$$LiN(C_mF_{2m+1}SO_2)(C_nF_{2n+1}SO_2)$$ Chemical formula 26 where m and n independently represent an integer of 1 or more.

$$LiC(C_pF_{2p+1}SO_2)(C_qF_{2q+1}SO_2)(C_rF_{2r+1}SO_2)$$ Chemical formula 27 where p, q, and r independently represent an integer of 1 or more.

Furthermore, examples of other light metal salts may include lithium salts represented by Chemical formula 28. More preferable examples of lithium salts represented by Chemical formula 28 may include 1,2-perfluoroethanedisulfonylimide lithium represented by Chemical formula 29, 1,3-perfluoropropanedisulfonylimide lithium represented by Chemical formula 30, 1,3-perfluorobutanedisulfonylimide lithium represented by Chemical formula 31, and 1,4-perfluorobutanedisulfonylimide lithium represented by Chemical formula 32. Moreover, lithium salts, e.g., perfluoropropanediacidimide lithium represented by Chemical formula 33, may be included.

Chemical formula 28

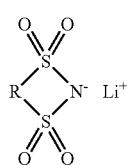

where R represents a straight chain or branched perfluoroalkylene group having the carbon number of 2 to 4.

Chemical formula 29

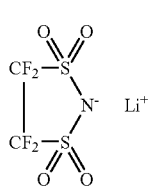

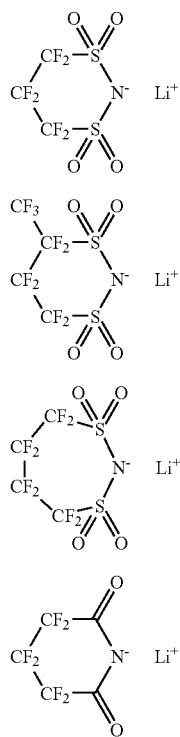

Chemical formula 30

Chemical formula 31

Chemical formula 32

Chemical formula 33

Most of all, when at least one type selected from the group consisting of $LiPF_6$, $LiBF_4$, $LiClO_4$, $LiAsF_6$, lithium salts represented by Chemical formula 26, lithium salts represented by Chemical formula 27, and lithium salts represented by Chemical formula 28 is included, a higher effect may be exerted and a high electrical conductivity may be obtained favorably. It is more preferable that $LiPF_6$ and at least one type selected from the group consisting of $LiBF_4$, $LiClO_4$, $LiAsF_6$, lithium salts represented by Chemical formula 26, lithium salts represented by Chemical formula 27, and lithium salts represented by Chemical formula 28 are used by mixing.

In particular, it is preferable that the electrolyte salt contains $LiBF_4$ on the grounds that generation of gas at the negative electrode may be further suppressed and excellent high temperature preservation characteristic may be exhibited.

Preferably, the content (concentration) of the electrolyte salt is within the range of 0.3 mol/kg or more, and 3.0 mol/kg or less relative to the solvent. This is because if the content is out of this range, the ionic conductivity may be reduced significantly, and satisfactory battery characteristics may not be exhibited. In the electrolyte salts, preferably, the content of the light metal salt represented by Chemical formula 12 is within the range of 0.01 mol/kg or more, and 2.0 mol/kg or less relative to the solvent. This is because a higher effect may be exerted within the above-described range.

A gel-like electrolyte, in which an electrolytic solution is held by a polymer compound, may be used as the electrolyte. The gel-like electrolyte is required to have an ionic conductivity of 1 mS/cm or more at room temperature, but the composition and the structure of the polymer compound are not specifically limited. The electrolytic solution (that is, a liquid solvent and an electrolyte salt) is as described above. Examples of polymer compounds may include polyacrylonitrile, polyvinylidene fluoride, a copolymer of polyvinylidene fluoride and polyhexafluoropropylene, polytetrafluoroethylene, polyhexafluoropropylene, polyethylene oxide, polypropylene oxide, polyphosphazene, polysiloxane, polyvinyl acetate, polyvinyl alcohol, polymethyl methacrylate, polyacrylic acid, polymethacrylic acid, styrene-butadiene rubber, nitrile-butadiene rubber, polystyrene, and polycarbonate. In particular, it is desirable that polyacrylonitrile, polyvinylidene fluoride, polyhexafluoropropylene, or a polymer compound having a structure of polyethylene oxide is used from the view point of electrochemical stability. The amount of addition of the polymer compound relative to the electrolytic solution varies depending on the compatibility between the two. In general, it is preferable to add the polymer compound corresponding to 5 percent by mass or more, and less than 50 percent by mass of the electrolytic solution.

The content of the electrolyte salt is similar to that of the electrolytic solution. Here, the solvent does not refer to merely liquid solvents, but is a concept widely containing solvents capable of dissociating the electrolyte salt and having ionic conductivity. Therefore, when a polymer compound having ionic conductivity is used, the polymer compound is also included in the solvent.

Secondary batteries, e.g., lithium batteries, having various shapes and sizes may be prepared by using the above-described electrolyte. A first example of a battery including an electrolyte according to an embodiment will be described below.

(First Example of Battery)

FIG. 1 shows a sectional structure of the first example of a secondary battery including the electrolyte according to an embodiment. This secondary battery is of a so-called cylinder type and includes a rolled electrode component 20, in which a band-shaped positive electrode 21 and a negative electrode 22 are laminated with a separator 23 therebetween and rolled, in the inside of a nearly hollow cylindrical battery case 11.

The battery case 11 is composed of iron (Fe) plated with, for example, nickel (Ni), one end portion is closed, and the other end is opened. In the inside of the battery case 11, a pair of insulating plates 12 and 13 are disposed perpendicularly to the circumference surface of the roll in such a way as to sandwich the rolled electrode component 20 therebetween.

A battery lid 14 and a safety valve mechanism 15 and a positive temperature coefficient element (PTC element) 16, which are disposed in the inside of the battery lid 14, are attached to the open end portion of the battery case 11 by swaging with a gasket 17 therebetween, and the inside of the battery can is hermetically sealed.

The battery lid 14 is composed of, for example, the same material as that for the battery case 11. The safety valve mechanism 15 is electrically connected to the battery lid 14 with the PTC element 16 therebetween, and when an internal pressure of the battery reaches a predetermined value or more due to internal short circuit, heating from the outside, or the like, a disk plate 15A is reversed so as to cut the electrical connection between the battery lid 14 and the rolled electrode component 20.

When a temperature is increased, the resistance value of the PTC element 16 is increased so as to restrict a current and prevent abnormal heat generation due to a large current. The gasket 17 is composed of, for example, an insulating material and the surface is coated with asphalt.

A center pin 24, for example, is inserted into the center of the rolled electrode component 20. The positive electrode 21 of the rolled electrode component 20 is connected to a positive electrode lead 25 formed from aluminum (Al) or the like, and the negative electrode 22 is connected to a negative electrode lead 26 formed from nickel (Ni) or the like. The positive electrode lead 25 is welded to the safety valve mechanism 15 and, thereby, electrically connected to the battery lid 14. The negative electrode lead 26 is welded and electrically connected to the battery case 11.

Figure 2:
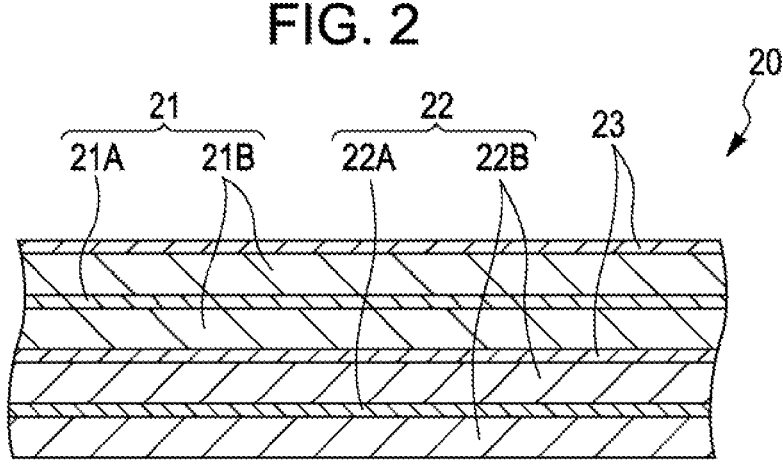
FIG. 2 is a magnified sectional view of a part of the rolled electrode component in the secondary battery shown in FIG. 1.

FIG. 2 is a magnified view of a part of the rolled electrode component 20 shown in FIG. 1. The positive electrode 21 includes, for example, a positive electrode collector 21A having a pair of surfaces opposed to each other and positive electrode active material layers 21B disposed on both surfaces of the positive electrode collector 21A. A region, in which the positive electrode active material layer 21B is present merely on one surface, may be included. The positive electrode collector 21A is composed of, for example, metal foil, e.g., aluminum foil, nickel foil, or stainless steel foil. For example, the positive electrode active material layer 21B contains a positive electrode material capable of absorbing and releasing lithium (Li), which is an electrode reaction material, as the positive electrode active material.

Preferable examples of positive electrode materials capable of absorbing and releasing lithium (Li) include lithium cobaltate, lithium niccolate, solid solutions containing them ($Li(Ni_xCo_yMn_z)O_2$) (x, y, and z satisfy $0<x<1$, $0<y<1$, $0<z<1$, and $x+y+z=1$), lithium compound oxides, e.g., manganese spinel ($LiMn_2O_4$), and phosphoric acid compounds, e.g., lithium iron phosphate ($LiFePO_4$), having an olivine structure. This is because a high energy density may be obtained.

Examples of positive electrode materials capable of absorbing and releasing lithium (Li) may include oxides, e.g., titanium oxide, vanadium oxide, and manganese dioxide, disulfides, e.g., iron disulfide, titanium disulfide, and molybdenum sulfide, and electrically conductive polymers, e.g., polyaniline and polythiophene. One type of positive electrode material may be used alone, or at least two types may be used by mixing.

The positive electrode active material layer 21B may contain, for example, an electrically conductive agent, and may further contain a binder, if necessary. Examples of electrically conductive agents may include carbon materials, e.g., graphite, carbon black, and Ketjenblack. At least one of them is used alone or by mixing. Besides the carbon materials, a metal material or an electrically conductive polymer material may be used insofar as the material has electrical conductivity.

Examples of binders may include synthetic rubber, e.g., styrene butadiene based rubber, fluorine based rubber, and ethylene propylene diene rubber, and polymer materials, e.g., polyvinylidene fluoride. At least one of them is used alone or by mixing. For example, in the case where the positive electrode 21 and the negative electrode 22 are rolled as shown in FIG. 1, it is preferable that the styrene butadiene based rubber, the fluorine based rubber, or the like exhibiting high flexibility is used as the binder.

The negative electrode 22 includes, for example, negative electrode collector 22A having a pair of surfaces opposed to each other and negative electrode active material layers 22B disposed on both surfaces of the negative electrode collector 22A. A region, in which the negative electrode active material layer 22B is present merely on one surface, may be included.

The negative electrode collector 22A is composed of, for example, metal foil, e.g., copper foil, nickel foil, or stainless steel foil, having good electrochemical stability, electrical conductivity, and mechanical strength. In particular, the copper foil is most preferable because high electrical conductivity is exhibited.

In some cases, it is preferable that the negative electrode collector 22A may be composed of the metal material containing at least one type of metal element which does not form an intermetallic compound with lithium (Li). This is because if the intermetallic compound with lithium (Li) is formed, expansion and shrinkage may occur due to charging and discharging so as to cause structural destruction and, thereby, the current collection property may deteriorate. In addition, the ability to support the negative electrode active material layer 22B is reduced and the negative electrode active material layer 22B may fall off the negative electrode collector 22A. In the present specification, the metal material includes not only metal element simple substances, but also alloys composed of at least two types of metal element and alloys composed of at least one type of metal element and at least one type of semimetal element. Examples of metal elements which do not form an intermetallic compound with lithium (Li) may include copper (Cu), nickel (Ni), titanium (Ti), iron (Fe), and chromium (Cr).

The negative electrode active material layer 22B contains at least one type of negative electrode material capable of absorbing and releasing lithium (Li) as the negative electrode active material. If necessary, for example, a binder similar to that in the positive electrode active material layer 21B may be contained.

Examples of negative electrode materials capable of absorbing and releasing lithium (Li) include carbon materials, metal oxides, and polymer compounds. Examples of carbon materials may include graphitizable carbon, non-graphitizable carbon having a lattice spacing between (002) planes of 0.37 nm or more, and graphite having a lattice spacing between (002) planes of 0.340 nm or less. More specific examples include pyrolytic carbon, coke, graphite, glassy carbon, organic polymer compound fired materials, carbon fibers, and activated carbon. Among them, examples of coke may include pitch coke, needle coke, and petroleum coke. The organic polymer compound fired materials refer to polymer compounds, e.g., phenol resins and furan resins, fired and carbonized at appropriate temperatures. Examples of metal oxides may include iron oxide, ruthenium oxide, and molybdenum oxide. Examples of polymer compounds may include polyacetylene and polypyrrole.

For example, the negative electrode active material layer 22B may contain at least one type of negative electrode material selected from the group consisting of single substances, alloys, and compounds of metal elements capable of absorbing and releasing lithium (Li), which is an electrode reaction material, and single substances, alloys, and compounds of semimetal elements capable of absorbing and releasing lithium (Li) as the negative electrode active material. According to this, a high energy density may be obtained. Furthermore, this negative electrode material may be used together with the above-described carbon material. Since changes in the crystal structure of the carbon material during charging and discharging are very small, when the carbon material is used together with the above-described negative electrode material, favorably, a high energy density may be obtained, excellent cycle characteristic may be exhibited, and furthermore, a function as an electrically conductive agent may also be performed. In the present specification, the alloy includes those composed of at least one type of metal element and at least one type of semimetal element, besides those composed of at least two types of metal elements. Nonmetallic elements may be contained. Examples of textures of alloys may include a solid solution, an eutectic crystal (eutectic mixture), an intermetallic compound, and textures in which at least two types of them coexist.

Examples of metal elements and semimetal elements for constituting the negative electrode material may include magnesium (Mg), boron (B), aluminum (Al), gallium (Ga), indium (In), silicon (Si), germanium (Ge), tin (Sn), lead (Pb), bismuth (Bi), cadmium (Cd), silver (Ag), zinc (Zn), hafnium (Hf), zirconium (Zr), yttrium (Y), palladium (Pd), and platinum (Pt). These may be crystalline or amorphous.

Examples of alloys and compounds of the above-described metal elements and semimetal elements include those represented by Chemical formulae $Ma_sMb_tLi_u$ and $Ma_pMc_qMd_r$. In these Chemical formulae, Ma represents at least one type of metal element and semimetal element capable of forming an alloy with lithium (Li), Mb represents at least one type of metal element and semimetal element other than lithium (Li) and Ma, Mc represents at least one type of nonmetallic element, and Md represents at least one type of metal element and semimetal element other than Ma. The values of s, t, u, p, q, and r satisfy $s>0$, $t\geqq0$, $u\geqq0$, $p>0$, $q>0$, and $r\geqq0$.

Most of all, it is preferable that the negative electrode material is a single substance, an alloy, or a compound of a group 4B metal element or semimetal element in the short-period form of the periodic table, and a single substance, an alloy, or a compound of silicon (Si) or tin (Sn) is particularly preferable. This is because a single substance, an alloy, or a compound of silicon (Si) or tin (Sn) has a high ability to absorb and release lithium (Li), and the energy density of the negative electrode 22 may be increased depending on the combination as compared with known graphite.

Specific examples of such alloys and compounds may include $Si_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, SiC, $Si_3N_4$, $Si_2N_2O$, $SiO_v$ ($0<v\leqq2$), $SnO_w$ ($0<w\leqq2$), $SnSiO_3$, LiSiO, LiSnO, $Mg_2Sn$, and alloys containing tin (Sn) and cobalt (Co).

Most of all, it is preferable that the negative electrode material is a CoSnC-containing material, in which tin (Sn), cobalt (Co), and carbon (C) are contained as constituent elements, the content of carbon is 9.9 percent by mass or more, and 29.7 percent by mass or less, and the ratio Co/(Sn+Co) of cobalt (Co) to the total of tin (Sn) and cobalt (Co) is 30 percent by mass or more and 70 percent by mass or less. This is because a high energy density may be obtained and excellent cycle characteristic may be exhibited in such a composition range.

The CoSnC-containing material may further contain other constituent elements, if necessary. Preferable examples of other constituent elements include silicon (Si), iron (Fe), nickel (Ni), chromium (Cr), indium (In), niobium (Nb), germanium (Ge), titanium (Ti), molybdenum (Mo), aluminum (Al), phosphorous (P), gallium (Ga), and bismuth (Bi). At least two types may be contained. This is because the capacity or the cycle characteristic may be further improved.

Preferably, this CoSnC-containing material has a phase containing tin (Sn), cobalt (Co), and carbon (C), and this phase has a low-crystallinity or amorphous structure. In this CoSnC-containing material, preferably, at least a part of carbon (C), which is a constituent element, is bonded to the metal element or the semimetal element, which is the other constituent element. It is believed that the cycle characteristic deteriorates due to cohesion or crystallization of tin (Sn) and the like. However, such cohesion or crystallization may be suppressed by bonding of carbon (C) to the other element.

Examples of measuring methods for checking the bonding state of an element may include X-ray photoelectron spectroscopy (XPS). With respect to the XPS, in an apparatus energy-calibrated in such a way that the peak of 4f orbital of gold atom (Au4f) appears at 84.0 eV, the peak of is orbital of carbon (C) (C1s) appears at 284.5 eV when carbon is graphite. When carbon is surface-contaminated carbon, the peak appears at 284.8 eV. On the other hand, in the case where the electric charge density of the carbon element is increased, for example, in the case where carbon (C) is bonded to a metal element or a semimetal element, the peak of C1s appears in a region lower than 284.5 eV. That is, in the case where the peak of composite wave of C1s with respect to the CoSnC-containing material appears in a region lower than 284.5 eV, at least a part of carbon (C) contained in the CoSnC-containing material is bonded to the metal element or the semimetal element, which is the other constituent element.

In the XPS measurement, for example, the peak of C1s is used for correction of the energy axis of the spectrum. In general, since surface-contaminated carbon is present on the surface, the peak of C1s of the surface-contaminated carbon is assumed to be 284.8 eV, and this is used as the reference of energy. With respect to the XPS measurement, the waveform of the peak of C1s is obtained as a form containing the peak of surface-contaminated carbon and the peak of carbon (C) in the CoSnC-containing material. Therefore, the peak of surface-contaminated carbon and the peak of carbon (C) in the CoSnC-containing material are separated through analysis by using, for example, a commercially available software. In the analysis of waveform, the position of the main peak present on the minimum binding energy side is assumed to be the reference of energy (248.8 eV).

The negative electrode active material layer 22B may be formed by any one of, for example, a gas phase method, a liquid phase method, a firing method, or coating. At least two of them may be combined. The firing method refers to a method in which a particulate negative electrode active material is mixed with a binder, a solvent, or the like, followed by molding and, thereafter, a heat treatment is performed at a temperature higher than the melting point of the binder, for example.

In the case where the negative electrode active material layer 22B is formed by the gas phase method, the liquid phase method, or the firing method, favorably, the negative electrode active material layer 22B and the negative electrode collector 22A may be alloyed at least at a part of the interface. Furthermore, alloying may be performed by a heat treatment in a vacuum atmosphere or in a non-oxidizing atmosphere. Specifically, it is preferable that at the interface, the constituent elements of the negative electrode collector 22A diffuse into the negative electrode active material layer 22B, the constituent elements of the negative electrode active material diffuse into the negative electrode collector 22A, or these occur in combination. This is because occurrence of destruction of the negative electrode active material layer 22B due to expansion and shrinkage resulting from charging and discharging may be suppressed and, in addition, the electron conductivity between the negative electrode active material layer 22B and the negative electrode collector 22A may be improved.

For example, a physical deposition method or a chemical deposition method may be used as the gas phase method. Specifically, a vacuum evaporation method, a sputtering method, an ion plating method, a laser abrasion method, a thermal CVD (chemical vapor deposition) method, a plasma CVD method, or the like may be used. For the liquid phase method, known methods, e.g., electrolytic plating or electroless plating, may be used. For the firing method, known methods may be used as well. For example, an atmospheric firing method, a reaction firing method, or a hot press firing method may be used. For the coating, the negative electrode active material layer 22B may be formed in a manner similar to that for the positive electrode 21.

Alternatively, the negative electrode active material layer 22B may be formed from, for example, a lithium metal which is a negative electrode active material. This is because a high energy density may be obtained. In this case, the negative electrode active material layer 22B may be disposed when assembly is completed. However, the negative electrode active material layer 22B may not be disposed when the assembly is completed, and be formed from a lithium metal deposited during charging. The negative electrode active material layer 22B may also serve as a collector, and the negative electrode collector 22A may not be provided.

The separator 23 may be composed of, for example, a synthetic resin porous film formed from polytetrafluoroethylene, polypropylene, polyethylene, or the like, a ceramic porous film, or a laminate of at least these two types of porous films. Most of all, a polyolefin porous film is preferable because an excellent effect of preventing occurrence of short circuit may be exhibited and the stability of battery may be improved through a shut down effect. In particular, polyethylene is a preferable material for constituting the separator 23 because the shut down effect is exerted within the range of 100° C. or more, and 160° C. or less and excellent electrochemical stability is exhibited. Polypropylene is also preferable. Other resins having chemical stability may be used by being co-polymerized or blended with polyethylene or polypropylene.

The separator 23 is impregnated with an electrolytic solution which is a liquid electrolyte. This electrolytic solution contains a liquid solvent, e.g., an organic solvent or other nonaqueous solvent, and an electrolyte salt dissolved in this nonaqueous solvent, and various additives may be contained, if necessary. A liquid nonaqueous solvent refers to a solvent which is composed of, for example, a nonaqueous compound and which has an intrinsic viscosity of 10.0 mPa·s or less at 25° C. The intrinsic viscosity of 10.0 mPa·s or less may be satisfied under the condition in which the electrolyte salt is dissolved. In the case where a solvent is produced by mixing a plurality of types of nonaqueous compounds, the intrinsic viscosity of 10.0 mPa·s or less may be satisfied under the condition of a mixture.

A method for manufacturing the first example of the battery will be described below. For example, the positive electrode active material, the electrically conductive agent, and the binder are mixed so as to prepare a positive electrode mix. The resulting positive electrode mix is dispersed in a solvent, e.g., N-methyl-2-pyrrolidone, so as to prepare a paste-like positive electrode mix slurry. The resulting positive electrode mix slurry is applied to the positive electrode collector 21A, the solvent is dried, and compaction molding is performed with a roll press machine or the like, so as to form the positive electrode active material layer 21B. In this manner, the positive electrode 21 is produced.

For example, the negative electrode active material and the binder are mixed so as to prepare a negative electrode mix. The resulting negative electrode mix is dispersed in a solvent, e.g., N-methyl-2-pyrrolidone, so as to prepare a paste-like negative electrode mix slurry. The resulting negative electrode mix slurry is applied to the negative electrode collector 22A, the solvent is dried, and compaction molding is performed with a roll press machine or the like, so as to form the negative electrode active material layer 22B. In this manner, the negative electrode 22 is produced.

Subsequently, a positive electrode lead 25 is attached to the positive electrode collector 21A by welding or the like and, in addition, a negative electrode lead 26 is attached to the negative electrode collector 22A by welding or the like. The positive electrode 21 and the negative electrode 22 are rolled with the separator 23 therebetween, the end portion of the positive electrode lead 25 is welded to the safety valve mechanism 15, and the end portion of the negative electrode lead 26 is welded to the battery case 11. The rolled positive electrode 21 and the negative electrode 22 are sandwiched with a pair of insulating plates 12 and 13, and are stored into the inside of the battery case 11. The electrolytic solution is injected into the inside of the battery case 11, and the separator 23 is impregnated with the electrolytic solution. The battery lid 14, the safety valve mechanism 15, and the PTC element 16 are fixed to the open end portion of the battery case 11 by swaging with the gasket 17 therebetween. In this manner, the secondary battery shown in FIG. 2 is produced.

In this secondary battery, for example, when charging is performed, lithium ions are released from the positive electrode active material layer 21B, and are occluded by the negative electrode material through the electrolytic solution, the negative electrode material being contained in the negative electrode active material layer 22B and being capable of occluding and releasing lithium (Li). Subsequently, when discharging is performed, lithium ions occluded in the negative electrode material, which is contained in the negative electrode active material layer 22B and is capable of occluding and releasing lithium (Li), are released and are occluded by the positive electrode active material layer 21B through the electrolytic solution.

(Second Example of Battery)

Figure 3:
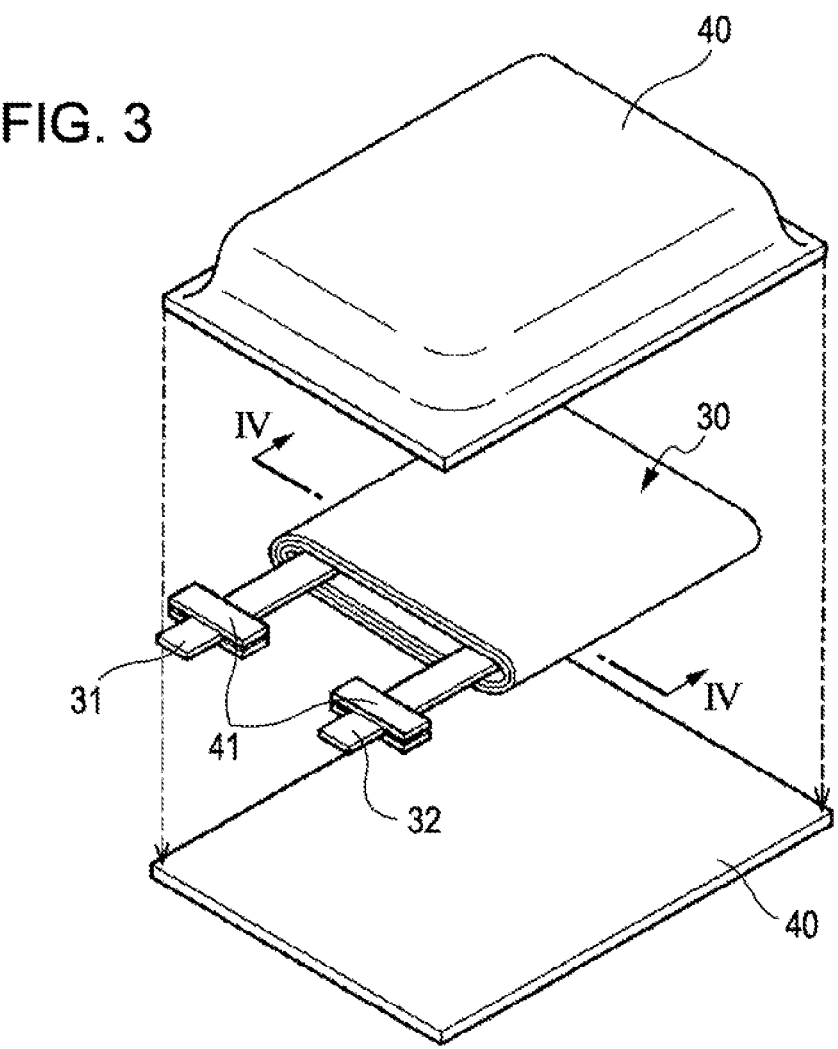
FIG. 3 is a perspective exploded view showing the configuration of a second example of a secondary battery including an electrolyte according to an embodiment.

The second example of the battery will be described below. FIG. 3 is a perspective exploded view showing an example of the configuration of the second example of the battery. In this secondary battery, a rolled electrode component 30 provided with a positive electrode lead 31 and a negative electrode lead 32 is held in the inside of a film-shaped outer jacket component 40, and miniaturization, reduction in weight, and reduction in thickness are facilitated.

Each of the positive electrode lead 31 and the negative electrode lead 32 is lead from the inside of the outer jacket component 40 toward the outside, for example, in the same direction. Each of the positive electrode lead 31 and the negative electrode lead 32 is composed of a metal material, e.g., aluminum (Al), copper (Cu), nickel (Ni), or stainless steel (SUS), and is in the shape of a thin plate or a mesh.

The outer jacket component 40 is composed of a rectangular aluminum laminate film in which, for example, a nylon film, aluminum foil, and a polyethylene film are bonded together in that order. The outer jacket component 40 is disposed in such a way that, for example, the polyethylene film side and the rolled electrode component 30 are opposed to each other, and individual fringe portions are adhered to each other by fusion or with an adhesive. Adhesion films 41 are interposed between the outer jacket component 40 and the positive electrode lead 31 and between the outer jacket component 40 and the negative electrode lead 32 in order to prevent the outer air from entering. The adhesion film 41 is formed from a material having adhesion to the positive electrode lead 31 and the negative electrode lead 32, for example, a polyolefin resin, e.g., polyethylene, polypropylene, modified polyethylene, or modified polypropylene.

Alternatively, the outer jacket component 40 may be composed of a laminate film having the structure different from that of the above-described aluminum laminate film, a polymer film, e.g., polypropylene, or a metal film in place of the aluminum laminate film.

Figure 4:
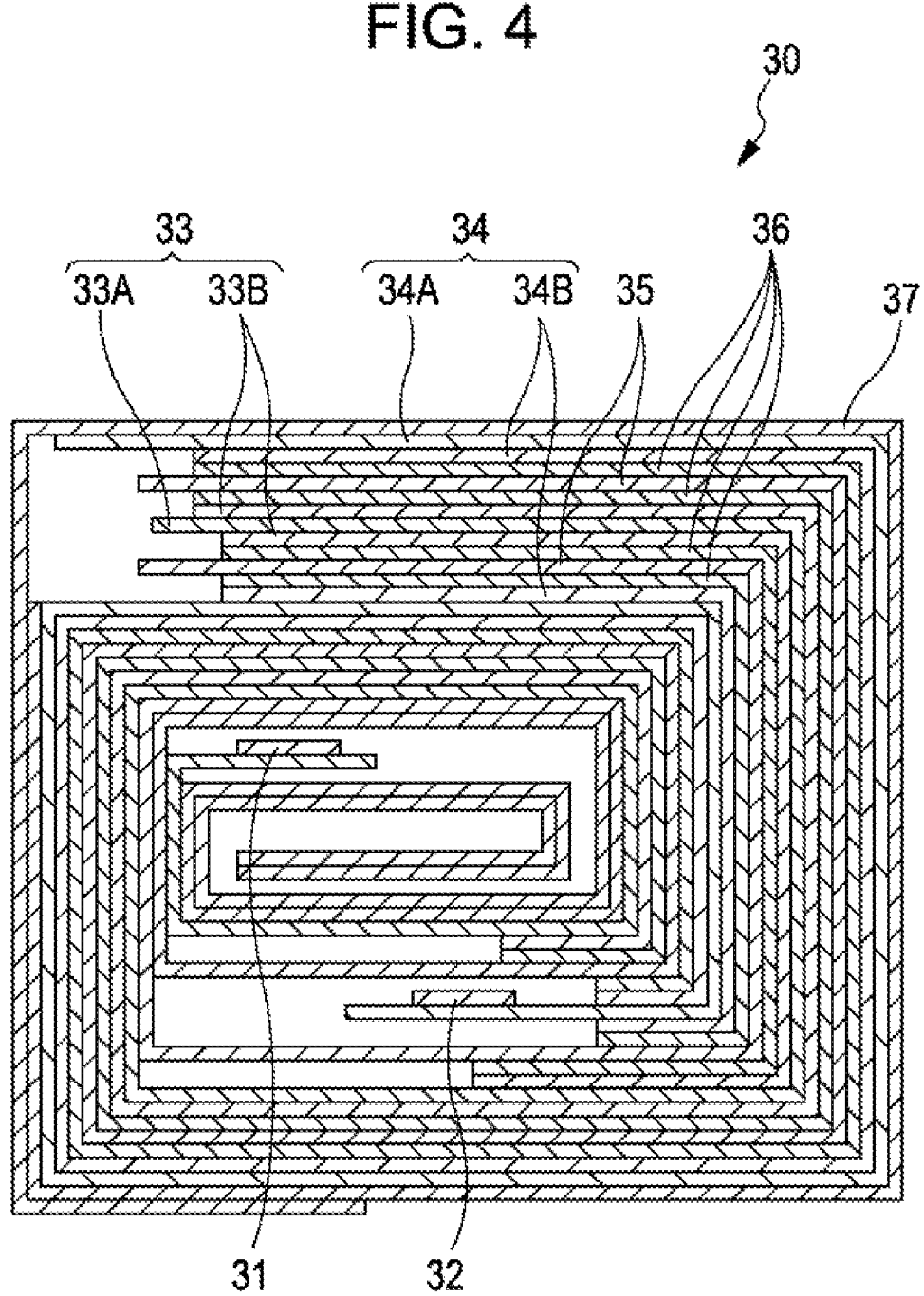
FIG. 4 is a sectional view of a section of the rolled electrode component, taken along a line IV-IV shown in FIG. 3.

FIG. 4 is a sectional view of a section of the rolled electrode component 30, taken along a line IV-IV shown in FIG. 3. In the rolled electrode component 30, a positive electrode 33 and a negative electrode 34 are laminated with a separator 35 and an electrolyte layer 36 therebetween, followed by rolling, and an outermost perimeter portion is protected by a protective tape 37.

The positive electrode 33 has a structure in which a positive electrode active material layer 33B is disposed on one surface or each of the two surfaces of a positive electrode collector 33A. The negative electrode 34 has a structure in which a negative electrode active material layer 34B is disposed on one surface or each of the two surfaces of a negative electrode collector 34A. The negative electrode active material layer 34B and the positive electrode active material layer 33B are disposed while being opposed to each other. The configurations of the positive electrode collector 33A, the positive electrode active material layer 33B, the negative electrode collector 34A, the negative electrode active material layer 34B, and the separator 35 are the same as the configurations of the positive electrode collector 21A, the positive electrode active material layer 21B, the negative electrode collector 22A, the negative electrode active material layer 22B, and the separator 23, respectively, described in the first example.

The electrolyte layer 36 includes an electrolytic solution and a polymer compound serving as a retainer for retaining this electrolytic solution, and is in a so-called gel state. The gel electrolyte layer 36 is preferable because a high ionic conductivity may be exhibited and, in addition, leakage of solution of a battery may be prevented. The electrolytic solution may be used as a liquid electrolyte without being retained by the polymer compound.

An example of the method for manufacturing the second example of the battery will be described below. Each of the positive electrode 33 and the negative electrode 34 is coated with a precursor solution containing the solvent, the electrolyte salt, the polymer compound, and the mixed solvent, and the mixed solvent is vaporized so as to form the gel electrolyte layer 36. Thereafter, the positive electrode lead 31 is attached by welding to the end portion of the positive electrode collector 33A and, in addition, the negative electrode lead 32 is attached by welding to the end portion of the negative electrode collector 34A.

The positive electrode 33 and the negative electrode 34 provided with the gel electrolyte layers 36 are laminated with the separator 35 therebetween, so as to produce a laminate. The resulting laminate is rolled in the longitudinal direction thereof, a protective tape 37 is adhered to the outermost portion, so as to form the rolled electrode component 30. Finally, for example, the rolled electrode component 30 is sandwiched between the outer jacket components 40, and the fringe portions of the outer jacket components 40 are adhered to each other by heat fusion or the like so as to seal. At that time, adhesion films 41 are interposed between the positive electrode lead 31 and the outer jacket component 40 and between the negative electrode lead 32 and the outer jacket component 40. In this manner, the secondary battery shown in FIG. 3 and FIG. 4 is produced.

This secondary battery may be produced as described below. The positive electrode 33 and the negative electrode 34 are prepared as described above. The positive electrode lead 31 and the negative electrode lead 32 are attached to the positive electrode 33 and the negative electrode 34, respectively. Thereafter, the positive electrode 33 and the negative electrode 34 are laminated with the separator 35 therebetween, followed by rolling. A protective tape 37 is adhered to the outermost portion, so as to form the rolled electrode component 30. The resulting rolled electrode component 30 is sandwiched between the outer jacket components 40, the fringe portions except one side are heat-fused into the shape of a bag, so that the rolled electrode component 30 is stored into the inside of the outer jacket components 40. Subsequently, an electrolyte composition containing the solvent, the electrolyte salt, a monomer serving as a material for the polymer compound, a polymerization initiator, and if necessary, other materials, e.g., a polymerization inhibitor, is prepared and injected into the inside of the outer jacket components 40.

After the electrolyte composition is injected, the opening of the outer jacket components 40 is heat-fused in a vacuum atmosphere so as to be hermetically sealed. The monomer is polymerized to produce a polymer compound by being heated, so that the gel electrolyte layer 36 is formed. In this manner, the secondary battery shown in FIG. 4 is produced.

A method for manufacturing an electrolyte according to another embodiment will be described below. In the method for manufacturing an electrolyte according to the present embodiment of the application, a compound represented by Chemical formula 34 and a fluorine gas are brought into contact with each other in a solvent inert to a fluorine gas, so as to prepare a compound represented by Chemical formula 35 and a compound represented by Chemical formula 36 and produce an electrolyte containing at least one type of these compounds. This method for manufacturing an electrolyte according to the present embodiment of the application is suitable for the production of the electrolyte according to the above-described embodiment.

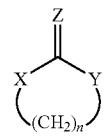

Chemical formula 34 where X, Y, and Z independently represent sulfur (S) or oxygen (O); at least one of X, Y, and Z is sulfur (S); and n represents an integer of 2 or more,

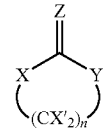

Chemical formula 35 where X, Y, and Z are the same as X, Y, and Z in Chemical formula 34; n is the same as n in Chemical formula 34; and X' is hydrogen (H) or fluorine (F) and contains at least one fluorine (F), and

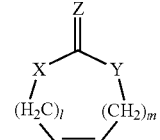

Chemical formula 36 where X, Y, and Z are the same as X, Y, and Z in Chemical formula 34; l and m independently represent an integer of 0 or more and satisfy the relationship indicated by $n=l+m+2$; and n is the same as n in Chemical formula 34.

For example, in Japanese Unexamined Patent Application Publication No. 2000-309583 and Japanese Unexamined Patent Application Publication No. 2004-161638, it is proposed that the characteristics of lithium ion battery are improved by using a fluorinated cyclic carbonic acid ester as a solvent or an additive, and synthesis of fluorinated cyclic carbonic acid esters through direct fluorination by using a fluorine gas is proposed as the method for synthesizing a cyclic carbonic acid ester.

In Japanese Unexamined Patent Application Publication No. 2006-31948, it is proposed that the battery characteristics are improved by adding a sulfur-containing cyclic compound, e.g., ethylene trithiocarbonate and sultones, as an additive to an electrolytic solution of the lithium ion battery.

In Japanese Unexamined Patent Application Publication No. 2002-47286, it is reported that a fluorinated sulfur cyclic compound is also used as an additive for the lithium ion battery, and a method, in which fluorinated sultones are produced through direct fluorination by using a fluorine gas, is proposed.

An appropriate method for synthesizing a fluorinated thiocarbonate compound has not been known previously. However, in recent years, it has been reported that the cyclic compound is produced through electrochemical fluorination (refer to Electrochimica. Acta, 51, 2477, 2006). However, there is a problem in that the industrial use of the method for manufacturing fluorinated thioethylene carbonates through electrochemical fluorination is difficult from the view point of cost and scale.

In a method for manufacturing an electrolyte according to the present embodiment, the compound represented by Chemical formula 34 and a fluorine gas are brought into contact with each other in a solvent inert to a fluorine gas, so as to prepare a fluorinated thiocarbonate compound represented by Chemical formula 35 and unsaturated thiocarbonate represented by Chemical formula 36, and produce an electrolyte containing at least one type of the fluorinated thiocarbonate compound and the unsaturated thiocarbonate. In the method for manufacturing an electrolyte according to the present embodiment, the fluorinated thiocarbonate and the unsaturated thiocarbonate may be simply and efficiently produced as compared with known manufacturing methods, e.g., electrochemical fluorination. Furthermore, the battery characteristics may be improved by using the electrolyte produced by the method for manufacturing an electrolyte according to the present embodiment for a nonaqueous electrolyte secondary battery, e.g., a lithium ion secondary battery.

For example, compounds represented by (37-1) to (37-15) of Chemical formula 37, which are compounds represented by Chemical formula 34 where n=2 to 4, may be used as the material.

Chemical formula 37

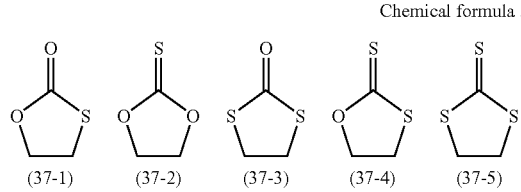

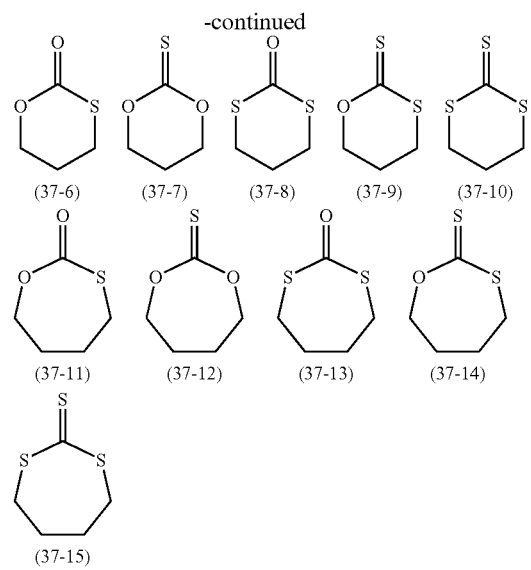

For example, when a compound represented by Chemical formula 38, which is a compound represented by Chemical formula 34 where Z=O, is used as the material, an electrolyte containing at least one type of a compound represented by Chemical formula 39, which is a compound represented by Chemical formula 35 where Z=O, and a compound represented by Chemical formula 40, which is a compound represented by Chemical formula 36 where Z=O, may be produced.

Chemical formula 38

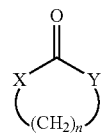

where X and Y independently represent sulfur (S) or oxygen (O); at least one of X and Y is sulfur (S); and n represents an integer of 2 or more, Chemical formula 39

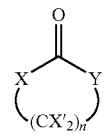

where X and Y are the same as X and Y in Chemical formula 38; n is the same as n in Chemical formula 38; and X' is hydrogen (H) or fluorine (F) and contains at least one fluorine (F), Chemical formula 40

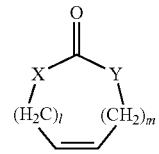

where X and Y are the same as X and Y in Chemical formula 38; l and m independently represent an integer of 0 or more and satisfy the relationship indicated by n=l+m+2; and n is the same as n in Chemical formula 38.

Specifically, for example, when 1,3-oxathiolane-2-on is used as the material, 4-fluoro-1,3-oxathiolane-2-on represented by Chemical formula 41 may be produced as a main product, and an electrolyte containing this may be produced efficiently. For example, when 1,3-dithiolane-2-on is used as the material, 4-fluoro-1,3-dithiolane-2-on represented by Chemical formula 42 may be produced as a main product, and an electrolyte containing this may be produced efficiently. For example, when 1,3-dithiolane-2-on is used as the material, 1,3-dithiol-2-on represented by Chemical formula 43 may be produced as a main product, and an electrolyte containing this may be produced efficiently.

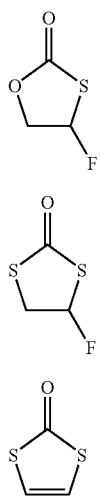

Chemical formula 41

Chemical formula 42

Chemical formula 43

In the method for manufacturing an electrolyte according to the present embodiment, the reaction is performed in a solvent, which is resistant to reacting with a fluorine gas or which does not react with a fluorine gas. For the solvent, for example, at least one type of acetonitrile, perfluoroalkanes having the carbon number of 4 or more, perfluoropolyethers (for example, DEMNUM produced by Daikin Industries Ltd.), and chlorotrifluoroethylene oligomer (for example, DAIFLOIL produced by Daikin Industries Ltd.) may be used.

Since the fluorine gas has very high reactivity, it is desirable that the fluorine gas is diluted with an inert gas in such a way that the concentration of the fluorine gas becomes within the range of 5 percent by volume to 30 percent by volume and is used for the reaction. Examples of inert gases may include nitrogen, argon, anhydrous hydrogen fluoride, and perfluoroalkanes having the carbon number of 4 or less. At least one type of them may be used.

In general, the reaction is performed at atmospheric pressure. If necessary, the reaction may be performed under a reduced pressure or under a pressure. The reaction temperature is usually within the range of −80° C. to 100° C. For example, in the case where acetonitrile is used as the solvent, it is preferable that the temperature is within the range of −30° C. to 80° C. in consideration of the melting point (−45.7° C.), the boiling point (81.7° C.), and the reactivity of acetonitrile and the solubility of the materials.

In order to absorb hydrogen fluoride (HF) generated by the reaction, the reaction may be performed while sodium fluoride (NaF) or the like is dispersed in the reaction solution.

It is believed that many compounds, e.g., fluorine monosubstituted compounds, fluorine disubstituted compounds to perfluorosubstituted compounds, and compounds having unsaturated bonds, are produced by the reaction. However, the reaction yield and the selectivity of the monofluorocompounds may be improved by adjusting the reaction condition.

EXAMPLES

The specific examples will be described with reference to FIG. 3 and FIG. 4. However, the present application is not limited to merely these examples. In the following description, Compound 12, Compound 13, succinic anhydride (SCAH), and propene sultone (PRS) refer to the compounds represented by the following (44-1) to (44-4), respectively, of Chemical formula 44.

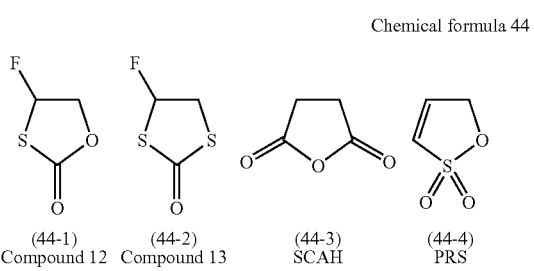

Chemical formula 44

(44-1) Compound 12  (44-2) Compound 13  (44-3) SCAH  (44-4) PRS

Example 1-1 to Example 1-23

Comparative Example 1-1 to Comparative Example 1-7

Lithium carbonate ($Li_2CO_3$) and cobalt carbonate ($CoCO_3$) was mixed at a ratio of $Li_2CO_3:CoCO_3=0.5:1$ (mole ratio), firing was performed in the air at 900° C. for hours, so that lithium-cobalt compound oxide ($LiCoO_2$) serving as a positive electrode material was produced.

Subsequently, 91 parts by mass of the resulting lithium-cobalt compound oxide, 6 parts by mass of graphite serving as an electrically conductive agent, and 3 parts by mass of polyvinylidene fluoride serving as a binder were mixed so as to prepare a positive electrode mix. A positive electrode mix slurry was prepared by dispersing the resulting positive electrode mix into N-methyl-2-pyrrolidone serving as a solvent, and was applied uniformly to both surfaces of a positive electrode collector 33A composed of band-shaped aluminum foil having a thickness of 12 μm, followed by drying. A positive electrode active material layer 33B was formed by compaction molding with a roll press machine, and a positive electrode 33 was prepared. Thereafter, an aluminum positive electrode lead 31 was attached to one end of the positive electrode collector 33A.

In Example 1-1 to Example 1-23 and Comparative example 1-1 to Comparative example 1-7, a negative electrode 34 was prepared as described below.

An artificial graphite powder was prepared as a negative electrode material, and 90 parts by mass of the resulting artificial graphite powder and 10 parts by mass of polyvinylidene fluoride serving as a binder were mixed so as to prepare a negative electrode mix. A negative electrode mix slurry was prepared by dispersing the resulting negative electrode mix into N-methyl-2-pyrrolidone (NMP) serving as a solvent, and was applied uniformly to both surfaces of a negative electrode collector 34A composed of band-shaped copper foil having a thickness of 15 μm, followed by drying. A negative electrode active material layer 34B was formed by compaction molding with a roll press machine, and a negative electrode 34 was prepared. Thereafter, a nickel negative electrode lead 32 was attached to one end of the negative electrode collector 34A.

The prepared positive electrode 33 and the negative electrode 34 were laminated with a separator 35 composed of a porous polyethylene film therebetween, and were rolled flat. The resulting rolled electrode component 30 was sandwiched between outer jacket components 40 composed of laminate films, the fringe portions except one side were heat-fused into the shape of a bag, so that the rolled electrode component 30 was stored into the inside of the outer jacket components 40. Subsequently, an electrolytic solution, which will be described below, was injected into the inside of the outer jacket components 40. The opening of the outer jacket components 40 was heat-fused in a vacuum atmosphere so as to be hermetically sealed. In this manner, secondary batteries of Example 1-1 to Example 1-23 and Comparative example 1-1 to Comparative example 1-7 were prepared. The laminate film composed of nylon-aluminum-non-oriented polypropylene in that order from the outside was used, and the thickness thereof were set at 30 µm, 40 µm, and 30 µm, respectively, and therefore 100 µm in total.

In Example 1-1 to Example 1-8, an electrolytic solution, in which a solvent prepared by mixing ethylene carbonate (EC) and diethyl carbonate (DEC) at a compositional ratio (EC:DEC) of 2:3 on a weight basis was blended with a compound described below, and thereafter, 1.0 mol/kg of $LiPF_6$ was dissolved as an electrolyte salt, was used. The solvent including the added compounds was assumed to be 100 percent by weight.

In Example 1-1, 1 percent by weight of Compound 12 was added. In Example 1-2, 1 percent by weight of Compound 13 was added. In Example 1-3, 1 percent by weight of Compound 12 and 1 percent by weight of vinylene carbonate (VC) were added. In Example 1-4, 1 percent by weight of Compound 12 and 1 percent by weight of vinylethylene carbonate (VEC) were added. In Example 1-5, 0.01 percent by weight of Compound 12 was added. In Example 1-6, 5 percent by weight of Compound 12 was added. In Example 1-7, 1 percent by weight of Compound 12 and 1 percent by weight of SCAH were added. In Example 1-8, 1 percent by weight of Compound 12 and 1 percent by weight of PRS were added.

In Example 1-9, an electrolytic solution, in which a solvent prepared by mixing ethylene carbonate (EC) and diethyl carbonate (DEC) at a compositional ratio (EC:DEC) of 2:3 on a weight basis was blended with Compound 12, and thereafter, 0.9 mol/kg of $LiPF_6$ and 0.1 mol/kg of $LiBF_4$ were dissolved as an electrolyte salt, was used.

In Example 1-10 to Example 1-15, an electrolytic solution, in which a solvent prepared by mixing 4-fluoro-1,3-dioxolane-2-on (FEC) and diethyl carbonate (DEC) at a compositional ratio (FEC:DEC) of 2:3 on a weight basis was blended with a compound described below, and thereafter, 1.0 mol/kg of $LiPF_6$ was dissolved as an electrolyte salt, was used.

In Example 1-10, 1 percent by weight of Compound 12 was added. In Example 1-11, 1 percent by weight of Compound 13 was added. In Example 1-12, 1 percent by weight of Compound 12 and 1 percent by weight of vinylene carbonate (VC) were added. In Example 1-13, 1 percent by weight of Compound 12 and 1 percent by weight of vinylethylene carbonate (VEC) were added. In Example 1-14, 0.01 percent by weight of Compound 12 was added. In Example 1-15, 5 percent by weight of Compound 12 was added.

In Example 1-16 to Example 1-19, an electrolytic solution, in which a solvent prepared by mixing ethylene carbonate (EC), 4,5-difluoro-1,3-dioxolane-2-on (DFEC), and diethyl carbonate (DEC) at a compositional ratio (EC:DFEC:DEC) of 2:1:7 on a weight basis was blended with a compound described below, and thereafter, 1.0 mol/kg of $LiPF_6$ was dissolved as an electrolyte salt, was used.

In Example 1-16, 1 percent by weight of Compound 12 was added. In Example 1-17, 1 percent by weight of Compound 13 was added. In Example 1-18, 1 percent by weight of Compound 12 and 1 percent by weight of vinylene carbonate (VC) were added. In Example 1-19, 1 percent by weight of Compound 12 and 1 percent by weight of vinylethylene carbonate (VEC) were added.

In Example 1-20 to Example 1-23, an electrolytic solution, in which a solvent prepared by mixing ethylene carbonate (EC) and diethyl carbonate (DEC) at a compositional ratio (EC:DEC) of 2:3 on a weight basis was blended with 1 percent by weight of Compound 12, and thereafter, 1.0 mol/kg of an electrolyte salt described below was dissolved, was used.

In Example 1-20, 0.9 mol/kg of $LiPF_6$ and 0.1 mol/kg of compound represented by Chemical formula 20 were used as electrolyte salts. In Example 1-21, 0.9 mol/kg of $LiPF_6$ and 0.1 mol/kg of compound represented by Chemical formula 25 were used. In Example 1-22, 0.9 mol/kg of $LiPF_6$ and 0.1 mol/kg of compound represented by Chemical formula 30 were used. In Example 1-23, 0.8 mol/kg of $LiPF_6$, 0.1 mol/kg of compound represented by Chemical formula 25, and 0.1 mol/kg of compound represented by Chemical formula 30 were used.

In Comparative example 1-1, an electrolytic solution, in which 1.0 mol/kg of $LiPF_6$ serving as an electrolyte salt was dissolved into a solvent prepared by mixing ethylene carbonate (EC) and diethyl carbonate (DEC) at a compositional ratio (EC:DEC) of 2:3 on a weight basis, was used.

In Comparative example 1-2, an electrolytic solution, in which 1.0 mol/kg of $LiPF_6$ serving as an electrolyte salt was dissolved into a solvent prepared by mixing 4-fluoro-1,3-dioxolane-2-on (FEC) and diethyl carbonate (DEC) at a compositional ratio (FEC:DEC) of 2:3 on a weight basis, was used.

In Comparative example 1-3, an electrolytic solution, in which 1.0 mol/kg of $LiPF_6$ serving as an electrolyte salt was dissolved into a solvent prepared by mixing ethylene carbonate (EC), 4,5-difluoro-1,3-dioxolane-2-on (DFEC), and diethyl carbonate (DEC) at a compositional ratio (EC:DFEC:DEC) of 2:1:7 on a weight basis, was used.

In Comparative example 1-4, an electrolytic solution, in which 1 percent by weight of vinylene carbonate (VC) was added to a solvent prepared by mixing ethylene carbonate (EC) and diethyl carbonate (DEC) at a compositional ratio (EC:DEC) of 2:3 on a weight basis and, thereafter, 1.0 mol/kg of $LiPF_6$ was dissolved as an electrolyte salt, was used.

In Comparative example 1-5, an electrolytic solution, in which 1 percent by weight of vinylene carbonate (VC) was added to a solvent prepared by mixing 4-fluoro-1,3-dioxolane-2-on (FEC) and diethyl carbonate (DEC) at a compositional ratio (FEC:DEC) of 2:3 on a weight basis and, thereafter, 1.0 mol/kg of $LiPF_6$ was dissolved as an electrolyte salt, was used.

In Comparative example 1-6, an electrolytic solution, in which 1 percent by weight of vinylene carbonate (VC) was added to a solvent prepared by mixing ethylene carbonate (EC), 4,5-difluoro-1,3-dioxolane-2-on (DFEC), and diethyl carbonate (DEC) at a compositional ratio (EC:DFEC:DEC) of 2:1:7 on a weight basis and, thereafter, 1.0 mol/kg of $LiPF_6$ was dissolved as an electrolyte salt, was used.

In Comparative example 1-7, an electrolytic solution, in which 0.8 mol/kg of $LiPF_6$ and 0.2 mol/kg of compound represented by Chemical formula 20 serving as electrolyte salts were dissolved into a solvent prepared by mixing ethylene carbonate (EC) and diethyl carbonate (DEC) at a compositional ratio (EC:DEC) of 2:3 on a weight basis, was used.

Subsequently, with respect to the prepared secondary batteries of Example 1-1 to Example 1-23 and Comparative example 1-1 to Comparative example 1-7, a charge and discharge test was performed and the high temperature preservation characteristic and the high temperature cycle characteristic were examined. In Example 1-1, Example 1-2, and Comparative example 1-1, the ambient temperature cycle characteristic was also examined.

With respect to the high temperature preservation characteristic, 2 cycles of charge and discharge were performed at 23° C. Thereafter, charge was performed again and standing was performed in a constant temperature bath at 80° C. for 10 days. Subsequently, discharge was performed again at 23° C., and the ratio of the discharge capacity after the preservation to the discharge capacity before the preservation, that is, ("discharge capacity after the preservation"/"discharge capacity before the preservation")×100, was determined as the high temperature preservation characteristic. The discharge capacity before the preservation is the discharge capacity in the 2nd cycle, and the discharge capacity after the preservation is the discharge capacity just after the preservation, that is, the discharge capacity in the 3rd cycle in total.

With respect to the high temperature cycle characteristic, 2 cycles of charge and discharge were performed at 23° C. Thereafter, 50 cycles of charge and discharge were performed in a constant temperature bath at 60° C., and the ratio of the discharge capacity in the 50th cycle at the high temperature to the discharge capacity in the 2nd cycle at 23° C., that is, ("discharge capacity in the 50th cycle at 60° C."/"discharge capacity in the 2nd cycle at 23° C.")×100, was determined as the high temperature cycle characteristic.

With respect to the ambient temperature cycle characteristic, 2 cycles of charge and discharge were performed at 23° C. Thereafter, 100 cycles of charge and discharge were performed at 23° C., and the ratio of the discharge capacity to the discharge capacity in the 2nd cycle at 23° C., that is, ("discharge capacity in the 100th cycle at 23° C."/"discharge capacity in the 2nd cycle at 23° C.")×100, was determined as the ambient temperature cycle characteristic.

In the above-described measurement, with respect to the charge, constant-current constant-voltage charge of 0.2 C was performed up to an upper limit voltage of 4.2 V. With respect to the discharge, constant-current discharge of 0.2 C was performed up to a final voltage of 2.5 V. The obtained results are shown in Table 1.

TABLE 1

Battery shape: Laminate type
Negative electrode active material: Artificial graphite

| | Lithium salt | | Solvent | | | | Discharge capacity maintenance factor (%) | | |
| --- | --- | --- | --- | --- | --- | --- | --- | --- | --- |
| | First compound | Second compound | Type | Type | Type | percent by weight | After high temp preservation | After high temp cycle | After ambient temp cycle |
| Example 1-1 | | — | | | Compound 12 | 1 | 88 | 75 | 96 |
| Example 1-2 | | — | | | Compound 13 | 1 | 88 | 80 | 96 |
| Example 1-3 | | — | | | Compound 12 + VC | 1 + 1 | 87 | 82 | — |
| Example 1-4 | LiPF$_6$: 1.0 mol/kg | — | EC | DEC | Compound 12 + VEC | 1 + 1 | 86 | 78 | — |
| Example 1-5 | | — | | | Compound 12 | 0.01 | 83 | 70 | — |
| Example 1-6 | | — | | | Compound 12 | 5 | 86 | 70 | — |
| Example 1-7 | | — | | | Compound 12 + SCAH | 1 + 1 | 90 | 75 | — |
| Example 1-8 | | — | | | Compound 12 + PRS | 1 + 1 | 91 | 74 | — |
| Example 1-9 | LiPF$_6$: 0.9 mol/kg | LiBF$_4$: 0.1 mol/kg | | | Compound 12 | 1 + 1 | 90 | 74 | — |
| Example 1-10 | | — | | | Compound 12 | 1 | 90 | 77 | — |
| Example 1-11 | | — | | | Compound 13 | 1 | 89 | 82 | — |
| Example 1-12 | LiPF$_6$: 1.0 mol/kg | — | FEC | DEC | Compound 12 + VC | 1 + 1 | 91 | 84 | — |
| Example 1-13 | | — | | | Compound 12 + VEC | 1 + 1 | 90 | 82 | — |
| Example 1-14 | | — | | | Compound 12 | 0.01 | 85 | 75 | — |
| Example 1-15 | | — | | | Compound 12 | 5 | 89 | 76 | — |
| Example 1-16 | | — | | | Compound 12 | 1 | 90 | 80 | — |
| Example 1-17 | | — | | | Compound 13 | 1 | 89 | 84 | — |
| Example 1-18 | LiPF$_6$: 1.0 mol/kg | — | EC DFEC | DEC | Compound 12 + VC | 1 + 1 | 92 | 85 | — |
| Example 1-19 | | — | | | Compound 12 + VEC | 1 + 1 | 91 | 84 | — |
| Example 1-20 | LiPF$_6$: 0.9 mol/kg | Chem 20: 0.1 mol/kg | | | Compound 12 | 1 | 88 | 80 | — |
| Example 1-21 | LiPF$_6$: 0.9 mol/kg | Chem 25: 0.1 mol/kg | EC | DEC | Compound 12 | 1 | 92 | 82 | — |
| Example 1-22 | LiPF$_6$: 0.9 mol/kg | Chem 30: 0.1 mol/kg | | | Compound 12 | 1 | 88 | 76 | — |
| Example 1-23 | LiPF$_6$: 0.8 mol/kg | Chem 25: 0.1 mol/kg Chem 30: 0.1 mol/kg | | | Compound 12 | 1 | 92 | 83 | — |
| Comparative example 1-1 | | — | EC | DEC | — | — | 81 | 70 | 90 |
| Comparative example 1-2 | | — | FEC | DEC | — | — | 84 | 74 | — |

TABLE 1-continued

Battery shape: Laminate type
Negative electrode active material: Artificial graphite

| | Lithium salt | | Solvent | | | | Discharge capacity maintenance factor (%) | | |
|---|---|---|---|---|---|---|---|---|---|
| | First compound | Second compound | Type | Type | Type | percent by weight | After high temp preservation | After high temp cycle | After ambient temp cycle |
| Comparative example 1-3 | LiPF$_6$: 1.0 mol/kg | — | EC DFEC | DEC | — | — | 85 | 74 | — |
| Comparative example 1-4 | | — | EC | DEC | VC | 1 | 82 | 80 | — |
| Comparative example 1-5 | | — | FEC | DEC | VC | 1 | 85 | 82 | — |
| Comparative example 1-6 | | — | EC DFEC | DEC | VC | 1 | 87 | 82 | — |
| Comparative example 1-7 | LiPF$_6$: 0.8 mol/kg | Chem 20: 0.2 mol/kg | EC | DEC | — | — | 82 | 72 | — |

Chem: Chemical formula
temp: temperature

As shown in Table 1, in Example 1-1 to Example 1-23 in which the electrolytic solution containing Compound 12 or Compound 13 was used, the high temperature preservation characteristic and the high temperature cycle characteristic were improved as compared with those of corresponding Comparative example 1-1 to Comparative example 1-7 in which the electrolytic solutions different from the electrolytic solutions of Examples merely in that Compound 12 and Compound 13 were not contained were used. That is, in the case where the carbon material was used for the negative electrode, it was made clear that the high temperature characteristics were able to be improved by using the electrolytic solution containing the compound represented by Chemical formula 6.

In Example 1-1 in which the electrolytic solution containing Compound 12 was used and in Example 1-2 in which the electrolytic solution containing Compound 13 was used, the ambient temperature cycle characteristic were improved as compared with that of Comparative example 1-1 in which the electrolytic solution was different from the electrolytic solutions of Examples merely in that Compound 12 and Compound 13 were not contained was used. That is, in the case where the carbon material is used for the negative electrode, it was made clear that the ambient temperature cycle characteristic was able to be improved by using the electrolytic solution containing the compound represented by Chemical formula 6.

Furthermore, in Example 1-3 and Example 1-4 in which the electrolytic solution containing vinylene carbonate (VC) or vinylethylene carbonate (VEC) besides Compound 12 was used, the high temperature preservation characteristic and the high temperature cycle characteristic were improved as compared with those of Comparative example 1-1 in which the electrolytic solution different from the electrolytic solutions of Examples merely in that Compound 12, vinylene carbonate (VC), and vinylethylene carbonate (VEC) were not contained was used. Moreover, similar results were obtained on the basis of the comparisons between Example 1-12, Example 1-13, and Comparative example 1-2, in which the electrolytic solution containing 4-fluoro-1,3-dioxolane-2-on (FEC) was used. Similar results were obtained on the basis of the comparisons between Example 1-18, Example 1-19, and Comparative example 1-3, in which the electrolytic solution containing ethylene carbonate (EC), 4,5-difluoro-1,3-dioxolane-2-on (DFEC), and diethyl carbonate (DEC) was used.

In Example 1-3, the high temperature cycle characteristic was improved as compared with that of Example 1-1 in which the electrolytic solution different from the electrolytic solution of Example 1-3 merely in that vinylene carbonate (VC) was not contained was used. In Example 1-3, the high temperature preservation characteristic and the high temperature cycle characteristic were improved as compared with those of Comparative example 1-4 in which the electrolytic solution different from the electrolytic solution of Example 1-3 merely in that Compound 12 was not contained was used. Similar results were obtained on the basis of the comparisons between Example 1-12, Example 1-10, and Comparative example 1-5, in which the electrolytic solution containing 4-fluoro-1,3-dioxolane-2-on (FEC) was used. Moreover, in Example 1-18, in which the electrolytic solution containing 4,5-difluoro-1,3-dioxolane-2-on (DFEC) was used, the high temperature preservation characteristic and the high temperature cycle characteristic were improved as compared with those of Example 1-16 in which the electrolytic solution different from Example 1-18 merely in that vinylene carbonate (VC) was not contained was used and Comparative example 1-6 in which the electrolytic solution different from the electrolytic solution of Example 1-18 merely in that Compound 12 was not contained was used. Similar tendencies were observed in the results with respect to vinylethylene carbonate (VEC).

That is, in the case where the carbon material was used for the negative electrode, it was made clear that further excellent high temperature characteristics were able to be exhibited by using the electrolytic solution containing the cyclic carbonic acid ester having an unsaturated bond, besides the compound represented by Chemical formula 6.

In Example 1-7, the high temperature preservation characteristic was improved as compared with that of Example 1-1 which was different from Example 1-7 merely in that SCAH was not contained. That is, in the case where the carbon material was used for the negative electrode, it was made clear that further excellent high temperature preservation characteristic was able to be exhibited by using the electrolytic solution containing the cyclic sultone derivative, besides the compound represented by Chemical formula 6.

In Example 1-8, the high temperature preservation characteristic was improved as compared with that of Example 1-1 which was different from Example 1-8 merely in that PRS was not contained. That is, in the case where the carbon material was used for the negative electrode, it was made clear that further excellent high temperature preservation characteristic was able to be exhibited by using the electrolytic solution containing the acid anhydride, besides the compound represented by Chemical formula 6.

In Example 1-9, the high temperature preservation characteristic was improved as compared with that of Example 1-1 which was different from Example 1-9 merely in that LiBF$_4$ was not contained. That is, in the case where the carbon material was used for the negative electrode, it was made clear that further excellent high temperature characteristics were able to be exhibited by using the electrolytic solution containing LiBF$_4$, besides the compound represented by Chemical formula 6.

When Example 1-1 to Example 1-4, Example 1-10 to Example 1-13, and Example 1-16 to Example 1-19 were compared, it was made clear that further excellent high temperature characteristics were able to be exhibited by using the electrolytic solution further containing at least one type of 4-fluoro-1,3-dioxolane-2-on (FEC) and 4,5-difluoro-1,3-dioxolane-2-on (DFEC), besides the compound represented by Chemical formula 6. That is, in the case where the carbon material was used for the negative electrode, it was made clear that further excellent high temperature characteristics were able to be exhibited by using the electrolytic solution containing the compound represented by Chemical formula 10, besides the compound represented by Chemical formula 6.

Furthermore, it was ascertained from Example 1-1, Example 1-5, Example 1-6, Example 1-10, Example 1-14, and Example 1-15 that further excellent high temperature preservation characteristic and high temperature cycle characteristic were able to be exhibited when the content of Compound 12 was 0.01 percent by weight or more, and less than 5 percent by weight. Moreover, similar tendencies were observed in the results when the electrolytic solution containing Compound 13 in place of Compound 12 was used. That is, in the case where the carbon material was used for the negative electrode, it was made clear that the preferable content of the compound represented by Chemical formula 6 was 0.01 percent by weight or more, and less than 5 percent by weight.

In Example 1-20 to Example 1-23, the electrolytic solution containing Compound 12 and containing LiPF$_6$, which is a first compound, and a light metal salt, which is a second compound shown in Table 1, as lithium salts was used, and it was ascertained that the high temperature preservation characteristic and the high temperature cycle characteristic superior to those of Comparative example 1-1 were exhibited, while the electrolytic solution used in Comparative example 1-1 was different from the electrolytic solutions of Examples merely in that Compound 12 and the second compound shown in Table 1 were not contained.

Furthermore, in Example 1-20 to Example 1-23, it was ascertained that the high temperature preservation characteristic and the high temperature cycle characteristic were able to be further improved as compared with those in Example 1-1 in which the electrolytic solution different from the electrolytic solutions of Example 1-20 to Example 1-23 merely in that the second compound shown in Table 1 was not contained as the lithium salt was used.

In Example 1-20, it was ascertained that the high temperature preservation characteristic and the high temperature cycle characteristic were able to be further improved as compared with those in Comparative example 1-7 in which the electrolytic solution different from the electrolytic solution of Example 1-20 merely in that Compound 12 was not contained was used.

When Example 1-20 to Example 1-23 were compared, it was ascertained that among Example 1-20 to Example 1-23, particularly excellent high temperature preservation characteristic and high temperature cycle characteristic were able to be exhibited in Example 1-23 in which the electrolytic solution containing Compound 12, a light metal salt represented by Chemical formula 25, and a light metal salt represented by Chemical formula 30 was used.

That is, in the case where the carbon material was used for the negative electrode, it was made clear that further excellent high temperature characteristics were able to be exhibited by using the electrolytic solution containing at least one type of the light metal salt represented by Chemical formula 12 and the light metal salt represented by Chemical formula 28, besides the compound represented by Chemical formula 6. Furthermore, it was made clear that particularly excellent high temperature characteristics were able to be exhibited by using the electrolytic solution containing both the light metal salt represented by Chemical formula 12 and the light metal salt represented by Chemical formula 28, besides the compound represented by Chemical formula 6.

Example 2-1 to Example 2-23, Comparative Example 2-1 to Comparative Example 2-7

In Example 2-1 to Example 2-23 and Comparative example 2-1 to Comparative example 2-7, the negative electrode 34 was prepared as described below. As shown in Table 2, electrolytic solutions similar to those in Example 1-1 to Example 1-23 and Comparative example 1-1 to Comparative example 1-7 were used.

A lithium metal having a thickness of 30 µm was affixed to a negative electrode collector 34A composed of band-shaped copper foil having a thickness of 15 µm so as to form a negative electrode active material layer 34B, and the negative electrode 34 was prepared.

Subsequently, with respect to the prepared secondary batteries of Example 2-1 to Example 2-23 and Comparative example 2-1 to Comparative example 2-7, a charge and discharge test was performed and the high temperature preservation characteristic and the high temperature cycle characteristic were examined as in Example 1-1 to Example 1-23 and Comparative example 1-1 to Comparative example 1-7. The measurement results are shown in Table 2.

TABLE 2

Battery shape: Laminate type
Negative electrode active material: Lithium metal

| | Lithium salt | | Solvent | | | | Discharge capacity maintenance factor (%) | |
|---|---|---|---|---|---|---|---|---|
| | First compound | Second compound | Type | Type | Type | percent by weight | After high temp preservation | After high temp cycle |
| Example 2-1 | | — | | | Compound 12 | 1 | 88 | 65 |
| Example 2-2 | | — | | | Compound 13 | 1 | 87 | 66 |
| Example 2-3 | | — | | | Compound 12 + VC | 1 + 1 | 90 | 69 |
| Example 2-4 | | — | | | Compound 12 + VEC | 1 + 1 | 91 | 67 |

TABLE 2-continued

Battery shape: Laminate type
Negative electrode active material: Lithium metal

| | Lithium salt | | Solvent | | | | Discharge capacity maintenance factor (%) | |
|---|---|---|---|---|---|---|---|---|
| | First compound | Second compound | Type | Type | Type | percent by weight | After high temp preservation | After high temp cycle |
| Example 2-5 | LiPF$_6$: 1.0 mol/kg | — | EC | DEC | Compound 12 | 0.01 | 82 | 57 |
| Example 2-6 | | — | | | Compound 12 | 5 | 88 | 62 |
| Example 2-7 | | — | | | Compound 12 + SCAH | 1 + 1 | 90 | 66 |
| Example 2-8 | | — | | | Compound 12 + PRS | 1 + 1 | 91 | 66 |
| Example 2-9 | LiPF$_6$: 0.9 mol/kg | LiBF$_4$: 0.1 mol/kg | | | Compound 12 | 1 + 1 | 90 | 65 |
| Example 2-10 | | — | | | Compound 12 | 1 | 90 | 75 |
| Example 2-11 | | — | | | Compound 13 | 1 | 89 | 76 |
| Example 2-12 | | — | | | Compound 12 + VC | 1 + 1 | 90 | 78 |
| Example 2-13 | LiPF$_6$: 1.0 mol/kg | — | FEC | DEC | Compound 12 + VEC | 1 + 1 | 90 | 77 |
| Example 2-14 | | — | | | Compound 12 | 0.01 | 86 | 70 |
| Example 2-15 | | — | | | Compound 12 | 5 | 90 | 73 |
| Example 2-16 | | — | | | Compound 12 | 1 | 90 | 78 |
| Example 2-17 | LiPF$_6$: 1.0 mol/kg | — | EC DFEC | DEC | Compound 13 | 1 | 89 | 80 |
| Example 2-18 | | — | | | Compound 12 + VC | 1 + 1 | 92 | 80 |
| Example 2-19 | | — | | | Compound 12 + VEC | 1 + 1 | 90 | 79 |
| Example 2-20 | LiPF$_6$: 0.9 mol/kg | Chem 20: 0.1 mol/kg | | | Compound 12 | 1 | 90 | 80 |
| Example 2-21 | LiPF$_6$: 0.9 mol/kg | Chem 25: 0.1 mol/kg | EC | DEC | Compound 12 | 1 | 92 | 85 |
| Example 2-22 | LiPF$_6$: 0.9 mol/kg | Chem 30: 0.1 mol/kg | | | Compound 12 | 1 | 90 | 80 |
| Example 2-23 | LiPF$_6$: 0.8 mol/kg | Chem 25: 0.1 mol/kg Chem 30: 0.1 mol/kg | | | Compound 12 | 1 | 93 | 83 |
| Comparative example 2-1 | | — | EC | DEC | — | | 80 | 56 |
| Comparative example 2-2 | | — | FEC | DEC | — | | 84 | 70 |
| Comparative example 2-3 | LiPF$_6$: 1.0 mol/kg | — | EC DFEC | DEC | — | | 85 | 72 |
| Comparative example 2-4 | | — | EC | DEC | VC | 1 | 81 | 65 |
| Comparative example 2-5 | | — | FEC | DEC | VC | 1 | 85 | 71 |
| Comparative example 2-6 | | — | EC DFEC | DEC | VC | 1 | 86 | 73 |
| Comparative example 2-7 | LiPF$_6$: 0.8 mol/kg | Chem 20: 0.2 mol/kg | EC | DEC | — | | 85 | 77 |

Chem: Chemical formula
temp: temperature

As shown in Table 2, in Example 2-1 to Example 2-23 in which an electrolytic solution containing Compound 12 or Compound 13 was used, the high temperature preservation characteristic and the high temperature cycle characteristic were improved as compared with those of corresponding Comparative example 2-1 to Comparative example 2-7 in which the electrolytic solutions different from the electrolytic solutions of Examples merely in that Compound 12 and Compound 13 were not contained were used. That is, in the case where the lithium metal was used as the negative electrode active material, it was made clear that the high temperature characteristics were able to be improved by using the electrolytic solution containing the compound represented by Chemical formula 6.

Furthermore, in Example 2-3 and Example 2-4 in which the electrolytic solution containing vinylene carbonate (VC) or vinylethylene carbonate (VEC), besides Compound 12, was used, the high temperature preservation characteristic and the high temperature cycle characteristic were improved as compared with those of Comparative example 2-1 in which the electrolytic solution different from the electrolytic solutions of Examples merely in that Compound 12, vinylene carbonate (VC), and vinylethylene carbonate (VEC) were not contained was used. Moreover, similar results were obtained on the basis of the comparisons between Example 2-12, Example 2-13, and Comparative example 2-2, in which the electrolytic solution containing 4-fluoro-1,3-dioxolane-2-on (FEC) was used. Similar results were obtained on the basis of the comparisons between Example 2-18, Example 2-19, and Comparative example 2-3, in which the electrolytic solution containing ethylene carbonate (EC), 4,5-difluoro-1,3-dioxolane-2-on (DFEC), and diethyl carbonate (DEC) was used.

That is, in the case where the lithium metal was used as the negative electrode active material, it was made clear that further excellent high temperature characteristics were able to be exhibited by using the electrolytic solution containing the compound represented by Chemical formula 6.

In Example 2-3, the high temperature preservation characteristic and the high temperature cycle characteristic were improved as compared with those of Example 2-1 in which the electrolytic solution different from the electrolytic solution of Example 2-3 merely in that vinylene carbonate (VC) was not contained was used and Comparative example 2-4 in which the electrolytic solution different from the electrolytic solution of Example 2-3 merely in that Compound 12 was not contained was used.

In Example 2-12 in which the electrolytic solution containing 4-fluoro-1,3-dioxolane-2-on (FEC) was used, the high temperature preservation characteristic was equivalent to that of Example 2-10 in which the electrolytic solution different from the electrolytic solution of Example 2-12 merely in that vinylene carbonate (VC) was not contained was used, but the high temperature cycle characteristic was improved. In Example 2-12, the high temperature preservation characteristic and the high temperature cycle characteristic were improved as compared with those of Comparative example 2-5 in which the electrolytic solution different from the electrolytic solution of Example 2-12 merely in that Compound 12 was not contained was used. Moreover, in Example 2-18, in which the electrolytic solution containing 4,5-difluoro-1, 3-dioxolane-2-on (DFEC) was used, the high temperature preservation characteristic and the high temperature cycle characteristic were improved as compared with those of Example 2-16 in which the electrolytic solution different from the electrolytic solution of Example 2-18 merely in that vinylene carbonate (VC) was not contained was used and Comparative example 2-6 in which the electrolytic solution different from the electrolytic solution of Example 2-18 merely in that Compound 12 was not contained was used. Similar tendencies were observed in the results with respect to vinylethylene carbonate (VEC).

That is, in the case where the lithium metal was used as the negative electrode active material, it was made clear that further excellent high temperature characteristics were able to be exhibited by using the electrolytic solution containing the cyclic carbonic acid ester having an unsaturated bond, besides the compound represented by Chemical formula 6.

In Example 2-7, the high temperature preservation characteristic was improved as compared with that of Example 2-1 which was different from Example 2-7 merely in that SCAH was not contained. That is, in the case where the lithium metal was used as the negative electrode active material, it was made clear that further excellent high temperature preservation characteristic was able to be exhibited by using the electrolytic solution containing the cyclic sultone derivative, besides the compound represented by Chemical formula 6.

In Example 2-8, the high temperature preservation characteristic was improved as compared with that of Example 2-1 which was different from Example 2-8 merely in that PRS was not contained. That is, in the case where the lithium metal was used as the negative electrode active material, it was made clear that further excellent high temperature preservation characteristic was able to be exhibited by using the electrolytic solution containing the acid anhydride, besides the compound represented by Chemical formula 6.

In Example 2-9, the high temperature preservation characteristic was improved as compared with that of Example 2-1 which was different from Example 2-9 merely in that $LiBF_4$ was not contained. That is, in the case where the lithium metal was used as the negative electrode active material, it was made clear that further excellent high temperature characteristics were able to be exhibited by using the electrolytic solution containing $LiBF_4$, besides the compound represented by Chemical formula 6.

When Example 2-1 to Example 2-4, Example 2-10 to Example 2-13, and Example 2-16 to Example 2-19 were compared, it was made clear that further excellent high temperature characteristics were able to be exhibited by using the electrolytic solution further containing at least one type of 4-fluoro-1,3-dioxolane-2-on (FEC) and 4,5-difluoro-1,3-dioxolane-2-on (DFEC), besides the compound represented by Chemical formula 6. That is, in the case where the lithium metal was used as the negative electrode active material, it was made clear that further excellent high temperature characteristics were able to be exhibited by using the electrolytic solution containing the compound represented by Chemical formula 10, besides the compound represented by Chemical formula 6.

Furthermore, it was ascertained from Example 2-1, Example 2-5, Example 2-6, Example 2-10, Example 2-14, and Example 2-15 that further excellent high temperature preservation characteristic and high temperature cycle characteristic were able to be exhibited when the content of Compound 12 was 0.01 percent by weight or more, and less than 5 percent by weight. Moreover, similar tendencies were observed in the results when the electrolytic solution containing Compound 13 in place of Compound 12 was used. That is, in the case where the lithium metal was used as the negative electrode active material, it was made clear that the preferable content of the compound represented by Chemical formula 6 was 0.01 percent by weight or more, and less than 5 percent by weight.

In Example 2-20 to Example 2-23, the electrolytic solution containing Compound 12 and containing $LiPF_6$, which is a first compound, and a light metal salt, which is a second compound shown in Table 2, as lithium salts was used, and it was ascertained that the high temperature preservation characteristic and the high temperature cycle characteristic superior to those of Comparative example 2-1 were obtained, while the electrolytic solution used in Comparative example 2-1 was different from the electrolytic solutions of Examples merely in that Compound 12 and the second compound shown in Table 2 were not contained.

Furthermore, in Example 2-20 to Example 2-23, it was ascertained that the high temperature preservation characteristic and the high temperature cycle characteristic were able to be further improved as compared with those in Example 2-1 in which the electrolytic solution different from the electrolytic solutions of Example 1-20 to Example 1-23 merely in that the second compound shown in Table 2 was not contained as the lithium salt was used.

In Example 2-20, it was ascertained that the high temperature preservation characteristic and the high temperature cycle characteristic were able to be further improved as compared with those in Comparative example 2-7 in which the electrolytic solution different from the electrolytic solution of Example 2-20 merely in that Compound 12 was not contained.

When Example 2-20 to Example 2-23 were compared, it was ascertained that among Example 2-20 to Example 2-23, particularly excellent high temperature preservation characteristic and high temperature cycle characteristic were able to be exhibited in Example 2-23 in which the electrolytic solution containing Compound 12, a light metal salt represented by Chemical formula 25, and a light metal salt represented by Chemical formula 30 was used.

That is, in the case where the lithium metal was used as the negative electrode active material, it was made clear that further excellent high temperature characteristics were able to be obtained by using the electrolytic solution containing at least one type of the light metal salt represented by Chemical formula 12 and the light metal salt represented by Chemical formula 28, besides the compound represented by Chemical formula 6. Furthermore, it was made clear that particularly excellent high temperature characteristics were able to be exhibited by using the electrolytic solution containing both the light metal salt represented by Chemical formula 12 and the light metal salt represented by Chemical formula 28, besides the compound represented by Chemical formula 6.

Example 3-1 to Example 3-23, Comparative Example 3-1 to Comparative Example 3-7

In Example 3-1 to Example 3-23 and Comparative example 3-1 to Comparative example 3-7, the negative electrode 34 was prepared as described below. As shown in Table 3, electrolytic solutions similar to those in Example 1-1 to Example 1-23 and Comparative example 1-1 to Comparative example 1-7 were used.

A negative electrode active material layer 34B was formed on a negative electrode collector 34A composed of copper foil having a thickness of 15 μm by an electron beam evaporation method through the use of silicon (Si) as a negative electrode active material.

With respect to the prepared secondary batteries of Example 3-1 to Example 3-23 and Comparative example 3-1 to Comparative example 3-7, a charge and discharge test was performed and the high temperature preservation characteristic and the high temperature cycle characteristic were examined as in Example 1-1 to Example 1-23 and Comparative example 1-1 to Comparative example 1-7. In Example 3-1, Example 3-2, and Comparative example 3-1, the ambient temperature cycle characteristic was also examined as in Example 1-1, Example 1-2, and Comparative example 1-1. The measurement results are shown in Table 3.

TABLE 3

Battery shape: Laminate type
Negative electrode active material: Si is contained

| | Lithium salt | | Solvent | | | | Discharge capacity maintenance factor (%) | | |
|---|---|---|---|---|---|---|---|---|---|
| | First compound | Second compound | Type | Type | Type | percent by weight | After high temp preservation | After high temp cycle | After ambient temp cycle |
| Example 3-1 | | — | | | Compound 12 | 1 | 80 | 72 | 85 |
| Example 3-2 | | — | | | Compound 13 | 1 | 78 | 74 | 85 |
| Example 3-3 | | — | | | Compound 12 + VC | 1 + 1 | 82 | 74 | — |
| Example 3-4 | $LiPF_6$: 1.0 mol/kg | — | EC | DEC | Compound 12 + VEC | 1 + 1 | 81 | 73 | — |
| Example 3-5 | | — | | | Compound 12 | 0.01 | 72 | 65 | — |
| Example 3-6 | | — | | | Compound 12 | 5 | 80 | 68 | — |
| Example 3-7 | | — | | | Compound 12 + SCAH | 1 + 1 | 84 | 74 | — |
| Example 3-8 | | — | | | Compound 12 + PRS | 1 + 1 | 85 | 75 | — |
| Example 3-9 | $LiPF_6$: 0.9 mol/kg | $LiBF_4$: 0.1 mol/kg | | | Compound 12 | 1 + 1 | 85 | 74 | — |
| Example 3-10 | | — | | | Compound 12 | 1 | 87 | 76 | — |
| Example 3-11 | | — | | | Compound 13 | 1 | 86 | 78 | — |
| Example 3-12 | $LiPF_6$: 1.0 mol/kg | — | FEC | DEC | Compound 12 + VC | 1 + 1 | 88 | 79 | — |
| Example 3-13 | | — | | | Compound 12 + VEC | 1 + 1 | 87 | 77 | — |
| Example 3-14 | | — | | | Compound 12 | 0.01 | 82 | 75 | — |
| Example 3-15 | | — | | | Compound 12 | 5 | 87 | 74 | — |
| Example 3-16 | | — | | | Compound 12 | 1 | 89 | 79 | — |
| Example 3-17 | | — | | | Compound 13 | 1 | 88 | 81 | — |
| Example 3-18 | $LiPF_6$: 1.0 mol/kg | — | EC DFEC | DEC | Compound 12 + VC | 1 + 1 | 91 | 82 | — |
| Example 3-19 | | — | | | Compound 12 + VEC | 1 + 1 | 91 | 80 | — |
| Example 3-20 | $LiPF_6$: 0.9 mol/kg | Chem20: 0.1 mol/kg | | | Compound 12 | 1 | 87 | 78 | — |
| Example 3-21 | $LiPF_6$: 0.9 mol/kg | Chem25: 0.1 mol/kg | EC | DEC | Compound 12 | 1 | 90 | 82 | — |
| Example 3-22 | $LiPF_6$: 0.9 mol/kg | Chem 30: 0.1 mol/kg | | | Compound 12 | 1 | 88 | 72 | — |
| Example 3-23 | $LiPF_6$: 0.8 mol/kg | Chem25: 0.1 mol/kg Chem30: 0.1 mol/kg | | | Compound 12 | 1 | 92 | 82 | — |
| Comparative example 3-1 | | — | EC | DEC | — | | 70 | 65 | 66 |
| Comparative example 3-2 | | — | FEC | DEC | — | | 78 | 75 | — |
| Comparative example 3-3 | $LiPF_6$: 1.0 mol/kg | — | EC DFEC | DEC | — | | 84 | 78 | — |
| Comparative example 3-4 | | — | EC | DEC | VC | 1 | 72 | 70 | — |
| Comparative example 3-5 | | — | FEC | DEC | VC | 1 | 82 | 76 | — |
| Comparative example 3-6 | | — | EC DFEC | DEC | VC | 1 | 85 | 80 | — |
| Comparative example 3-7 | $LiPF_6$: 0.8 mol/kg | Chem 20: 0.2 mol/kg | EC | DEC | — | | 80 | 72 | — |

Chem: Chemical formula
temp: temperature

As shown in Table 3, in Example 3-1 to Example 3-23 in which an electrolytic solution containing Compound 12 or Compound 13 was used, the high temperature preservation characteristic and the high temperature cycle characteristic were improved as compared with those of corresponding Comparative example 3-1 to Comparative example 3-7 in which the electrolytic solutions different from the electrolytic solutions of Examples merely in that Compound 12 and Compound 13 were not contained were used. That is, in the case where the material containing silicon (Si) as a constituent element was used as the negative electrode active material, it was made clear that the high temperature characteristics were able to be improved by using the electrolytic solution containing the compound represented by Chemical formula 6.

In Example 3-1 in which the electrolytic solution containing Compound 12 was used and in Example 3-2 in which the electrolytic solution containing Compound 13 was used, the ambient temperature cycle characteristic was improved as compared with that of Comparative example 3-1 in which the electrolytic solution was different from the electrolytic solutions of Examples merely in that Compound 12 and Compound 13 were not contained was used. That is, in the case where the material containing silicon (Si) as a constituent element was used as the negative electrode active material, it was made clear that the ambient temperature cycle characteristic was able to be improved by using the electrolytic solution containing the compound represented by Chemical formula 6.

Furthermore, in Example 3-3 and Example 3-4 in which the electrolytic solution containing vinylene carbonate (VC) or vinylethylene carbonate (VEC), besides Compound 12, was used, the high temperature preservation characteristic and the high temperature cycle characteristic were improved as compared with those of Comparative example 3-1 in which the electrolytic solution different from the electrolytic solutions of Examples merely in that Compound 12, vinylene carbonate (VC), and vinylethylene carbonate (VEC) were not contained was used. Moreover, similar results were obtained on the basis of the comparisons between Example 3-12, Example 3-13, and Comparative example 3-2, in which the electrolytic solution containing 4-fluoro-1,3-dioxolane-2-on (FEC) was used. Similar results were obtained on the basis of the comparisons between Example 3-18, Example 3-19, and Comparative example 3-3, in which the electrolytic solution containing ethylene carbonate (EC), 4,5-difluoro-1,3-dioxolane-2-on (DFEC), and diethyl carbonate (DEC) was used. That is, in the case where the material containing silicon (Si) as a constituent element was used as the negative electrode active material, it was made clear that further excellent high temperature characteristics were able to be obtained by using the electrolytic solution containing the compound represented by Chemical formula 6.

In Example 3-3, the high temperature preservation characteristic and the high temperature cycle characteristic were improved as compared with those of Example 3-1 in which the electrolytic solution different from the electrolytic solution of Example 3-3 merely in that vinylene carbonate (VC) was not contained was used and Comparative example 3-4 in which the electrolytic solution different from the electrolytic solution of Example 3-3 merely in that Compound 12 was not contained was used. Furthermore, similar results were obtained on the basis of the comparisons between Example 3-12, Example 3-10, and Comparative example 3-5, in which the electrolytic solution containing 4-fluoro-1,3-dioxolane-2-on (FEC) was used. Moreover, in Example 3-18, in which the electrolytic solution containing 4,5-difluoro-1,3-dioxolane-2-on (DFEC) was used, the high temperature preservation characteristic and the high temperature cycle characteristic were improved as compared with those of Example 3-16 in which the electrolytic solution different from the electrolytic solution of Example 3-18 merely in that vinylene carbonate (VC) was not contained was used and Comparative example 3-6 in which the electrolytic solution different from the electrolytic solution of Example 3-18 merely in that Compound 12 was not contained was used. Similar tendencies were observed in the results with respect to vinylethylene carbonate (VEC).

That is, in the case where the material containing silicon (Si) as a constituent element was used as the negative electrode active material, it was made clear that further excellent high temperature characteristics were able to be exhibited by using the electrolytic solution containing the cyclic carbonic acid ester having an unsaturated bond, besides the compound represented by Chemical formula 6.

In Example 3-7, the high temperature preservation characteristic was improved as compared with that of Example 3-1 which was different from Example 3-7 merely in that SCAH was not contained. That is, in the case where the material containing silicon (Si) as a constituent element was used as the negative electrode active material, it was made clear that further excellent high temperature preservation characteristic was able to be exhibited by using the electrolytic solution containing the cyclic sultone derivative, besides the compound represented by Chemical formula 6.

In Example 3-8, the high temperature preservation characteristic and the high temperature cycle characteristic were improved as compared with those of Example 3-1 which was different from Example 3-8 merely in that PRS was not contained. That is, in the case where the material containing silicon (Si) as a constituent element was used as the negative electrode active material, it was made clear that further excellent high temperature characteristics were able to be exhibited by using the electrolytic solution containing the acid anhydride, besides the compound represented by Chemical formula 6.

In Example 3-9, the high temperature preservation characteristic and the high temperature cycle characteristic were improved as compared with that of Example 3-1 which was different from Example 3-9 merely in that $LiBF_4$ was not contained. That is, in the case where the material containing silicon (Si) as a constituent element was used as the negative electrode active material, it was made clear that further excellent high temperature characteristics were able to be exhibited by using the electrolytic solution containing $LiBF_4$, besides the compound represented by Chemical formula 6.

When Example 3-1 to Example 3-4, Example 3-10 to Example 3-13, and Example 3-16 to Example 3-19 were compared, it was made clear that further excellent high temperature characteristics were able to be exhibited by using the electrolytic solution further containing at least one type of 4-fluoro-1,3-dioxolane-2-on (FEC) and 4,5-difluoro-1,3-dioxolane-2-on (DFEC), besides the compound represented by Chemical formula 6. That is, in the case where the material containing silicon (Si) as a constituent element was used as the negative electrode active material, it was made clear that further excellent high temperature characteristics were able to be exhibited by using the electrolytic solution containing the compound represented by Chemical formula 10, besides the compound represented by Chemical formula 6.

Furthermore, it was ascertained from Example 3-1, Example 3-5, Example 3-6, Example 3-10, Example 3-14, and Example 3-15 that further excellent high temperature preservation characteristic and high temperature cycle characteristic were able to be exhibited when the content of Compound 12 was 0.01 percent by weight or more, and less than 5 percent by weight. Moreover, similar tendencies were observed in the results when the electrolytic solution containing Compound 13 in place of Compound 12 was used. That is, in the case where the material containing silicon (Si) as a constituent element was used as the negative electrode active material, it was made clear that the preferable content of the compound represented by Chemical formula 6 was 0.01 percent by weight or more, and less than 5 percent by weight.

In Example 3-20 to Example 3-23, the electrolytic solution containing Compound 12 and containing $LiPF_6$, which is a first compound, and a light metal salt, which is a second compound shown in Table 3, as lithium salts was used, and it was ascertained that the high temperature preservation characteristic and the high temperature cycle characteristic superior to those of Comparative example 3-1 were obtained, while the electrolytic solution used in Comparative example 3-1 was different from the electrolytic solutions of Examples merely in that Compound 12 and the second compound shown in Table 3 were not contained.

Furthermore, in Example 3-20 to Example 3-23, it was ascertained that the high temperature preservation characteristic was able to be improved and the high temperature cycle characteristic was improved or equivalent as compared with those in Example 3-1 in which the electrolytic solution different from the electrolytic solutions of Example 3-20 to Example 3-23 merely in that the second compound shown in Table 3 was not contained as the lithium salt was used.

In Example 3-20, it was ascertained that the high temperature preservation characteristic and the high temperature cycle characteristic were able to be further improved as compared with those in Comparative example 3-7 in which the electrolytic solution different from the electrolytic solution of Example 3-20 merely in that Compound 12 was not contained.

When Example 3-20 to Example 3-23 were compared, it was ascertained that among Example 3-20 to Example 3-23, particularly excellent high temperature preservation characteristic and high temperature cycle characteristic were able to be exhibited in Example 3-23 in which the electrolytic solution containing Compound 12, a light metal salt represented by Chemical formula 25, and a light metal salt represented by Chemical formula 30 was used.

That is, in the case where the material containing silicon (Si) as a constituent element was used as the negative electrode active material, it was made clear that further excellent high temperature characteristics were able to be exhibited by using the electrolytic solution containing at least one type of the light metal salt represented by Chemical formula 12 and the light metal salt represented by Chemical formula 28, besides the compound represented by Chemical formula 6. Furthermore, it was made clear that particularly excellent high temperature characteristics were able to be exhibited by using the electrolytic solution containing both the light metal salt represented by Chemical formula 12 and the light metal salt represented by Chemical formula 28, besides the compound represented by Chemical formula 6.

Example 4-1 to Example 4-12, Comparative Example 4-1 to Comparative Example 4-7

In Example 4-1 to Example 4-12 and Comparative example 4-1 to Comparative example 4-7, the negative electrode 34 was prepared as described below. The electrolytic solutions as described below were used.

Figure 5:
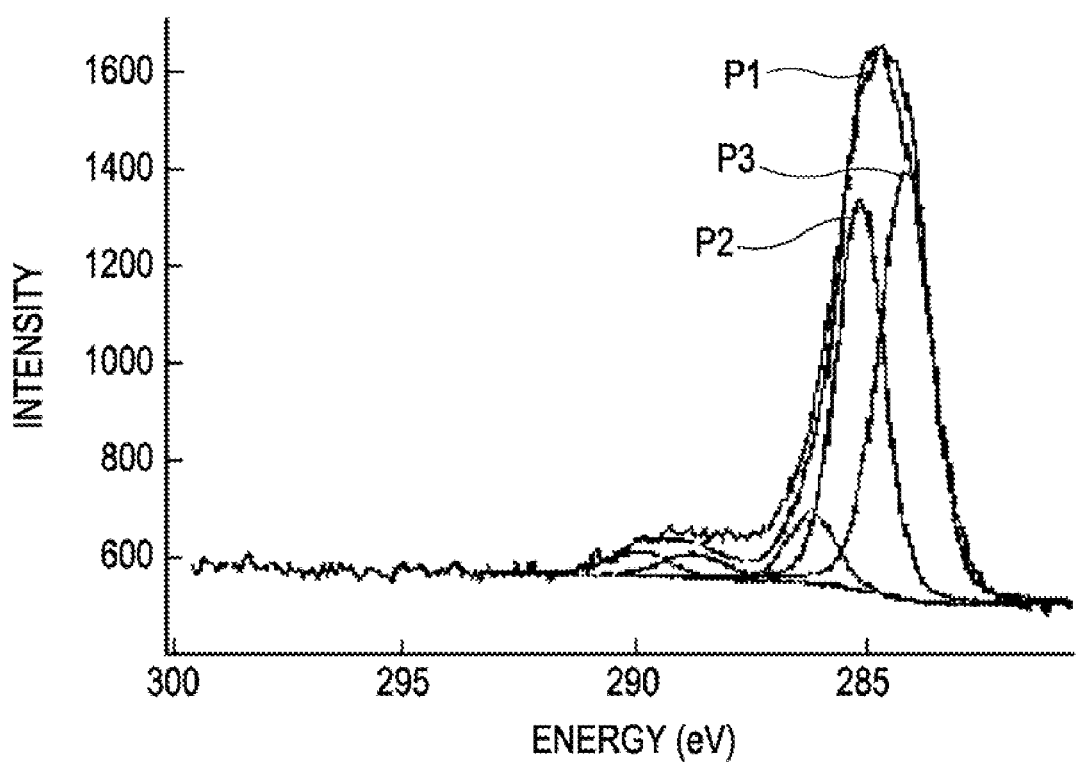
FIG. 5 is a diagram showing an example of peaks obtained by X-ray photoelectron spectroscopy of a negative electrode material prepared in an example.

A Co—Sn alloy powder and a carbon powder, which were raw materials, were dry-mixed at a predetermined ratio in such a way that the amount of the entire powder input became 10 g. The resulting mixture was set in a planetary ball mill reactor produced by ITO Seisakusho together with about 400 g of steel balls having a diameter of 9 mm. The inside of the reactor was replaced with an argon atmosphere, and an operation at a rotation speed of 250 rpm for 10 minutes and a pause for 10 minutes were repeated until the total operation time reached 20 hours. Subsequently, the reactor was cooled to room temperature and the composition of the synthesized negative electrode active material powder was analyzed. As a result, the content of tin (Sn) was 49.5 percent by mass, the content of cobalt (Co) was 29.7 percent by mass, the content of carbon (C) was 19.8 percent by mass, the ratio, Co/(Sn+ Co), of cobalt (Co) to the total of tin (Sn) and cobalt (Co) was 37.5 percent by mass. The content of carbon (C) was measured with a carbon-sulfur analyzer, and the contents of tin (Sn) and cobalt (Co) were measured with inductively coupled plasma (ICP) emission spectrometry. When X-ray diffraction analysis was performed, a diffraction peak having a wide half-width of 1° or more in terms of diffraction angle $2\theta$ was observed within the range of diffraction angle $2\theta$ of 20° to 50°. Furthermore, when X-ray photoelectron spectroscopy (XPS) was performed, a peak P1 was observed as shown in FIG. 5. When the peak P1 was analyzed, a peak P2 of surface-contaminated carbon and a peak P3 of C1s of the negative electrode active material powder were identified, the peak P3 being present on the lower energy side relative to the peak P2. The peak P3 was observed in the region lower than 284.5 eV. That is, it was ascertained that carbon (C) in the negative electrode active material powder was bonded to the other element.

Subsequently, 80 parts by mass of negative electrode active material powder, 11 parts by mass of graphite (KS-15 produced by Lonza) and 1 part by mass of acetylene black serving as electrically conductive agents, and 8 parts by mass of polyvinylidene fluoride serving as a binder were mixed and dispersed into N-methyl-2-pyrrolidone serving as a solvent, so as to prepare a negative electrode mix slurry. The resulting negative electrode mix slurry was applied uniformly to both surfaces of a negative electrode collector 34A composed of band-shaped copper foil having a thickness of 10 μm, followed by drying. A negative electrode active material layer 34B was formed by compaction molding at a constant pressure. In this manner, the negative electrode 34 was prepared.

In Example 4-1 to Example 4-4, an electrolytic solution, in which a solvent prepared by mixing ethylene carbonate (EC) and diethyl carbonate (DEC) at a compositional ratio (EC: DEC) of 2:3 on a weight basis was blended with a compound described below, and thereafter, 1.0 mol/kg of $LiPF_6$ was dissolved as an electrolyte salt, was used.

In Example 4-1, 1 percent by weight of Compound 12 was added. In Example 4-2, 1 percent by weight of Compound 12 and 1 percent by weight of vinylene carbonate (VC) were added. In Example 4-3, 1 percent by weight of Compound 12 and 1 percent by weight of SCAH were added. In Example 4-4, 1 percent by weight of Compound 12 and 1 percent by weight of PRS were added.

In Example 4-5 and Example 4-6, an electrolytic solution, in which a solvent prepared by mixing 4-fluoro-1,3-dioxolane-2-on (FEC) and diethyl carbonate (DEC) at a compositional ratio (FEC:DEC) of 2:3 on a weight basis was blended with a compound described below, and thereafter, 1.0 mol/kg of $LiPF_6$ was dissolved as an electrolyte salt, was used.

In Example 4-5, 1 percent by weight of Compound 12 was added. In Example 4-6, 1 percent by weight of Compound 12 and 1 percent by weight of vinylene carbonate (VC) were added.

In Example 4-7 and Example 4-8, an electrolytic solution, in which a solvent prepared by mixing ethylene carbonate (EC), 4,5-difluoro-1,3-dioxolane-2-on (DFEC), and diethyl carbonate (DEC) at a compositional ratio (EC:DFEC:DEC) of 2:1:7 on a weight basis was blended with a compound described below, and thereafter, 1.0 mol/kg of $LiPF_6$ was dissolved as an electrolyte salt, was used.

In Example 4-7, 1 percent by weight of Compound 12 was added. In Example 4-8, 1 percent by weight of Compound 12 and 1 percent by weight of vinylene carbonate (VC) were added.

In Example 4-9 to Example 4-12, an electrolytic solution, in which a solvent prepared by mixing ethylene carbonate (EC) and diethyl carbonate (DEC) at a compositional ratio (EC:DEC) of 2:3 on a weight basis was blended with 1 percent by weight of Compound 12, and thereafter, 1.0 mol/kg of electrolyte salts described below were dissolved, was used.

In Example 4-9, 0.9 mol/kg of $LiPF_6$ and 0.1 mol/kg of compound represented by Chemical formula 20 were used as electrolyte salts. In Example 4-10, 0.9 mol/kg of $LiPF_6$ and 0.1 mol/kg of compound represented by Chemical formula 25 were used. In Example 4-11, 0.9 mol/kg of $LiPF_6$ and 0.1 mol/kg of compound represented by Chemical formula 30 were used. In Example 4-12, 0.8 mol/kg of $LiPF_6$, 0.1 mol/kg of compound represented by Chemical formula 25, and 0.1 mol/kg of compound represented by Chemical formula 30 were used.

In Comparative example 4-1, an electrolytic solution, in which 1.0 mol/kg of $LiPF_6$ serving as an electrolyte salt was dissolved into a solvent prepared by mixing ethylene carbonate (EC) and diethyl carbonate (DEC) at a compositional ratio (EC:DEC) of 2:3 on a weight basis, was used.

In Comparative example 4-2, an electrolytic solution, in which 1.0 mol/kg of $LiPF_6$ serving as an electrolyte salt was dissolved into a solvent prepared by mixing 4-fluoro-1,3-dioxolane-2-on (FEC) and diethyl carbonate (DEC) at a compositional ratio (FEC:DEC) of 2:3 on a weight basis, was used.

In Comparative example 4-3, an electrolytic solution, in which 1.0 mol/kg of $LiPF_6$ serving as an electrolyte salt was dissolved into a solvent prepared by mixing ethylene carbonate (EC), 4,5-difluoro-1,3-dioxolane-2-on (DFEC), and diethyl carbonate (DEC) at a compositional ratio (EC:DFEC:DEC) of 2:1:7 on a weight basis, was used.

In Comparative example 4-4, an electrolytic solution, in which 1 percent by weight of vinylene carbonate (VC) was added to a solvent prepared by mixing ethylene carbonate (EC) and diethyl carbonate (DEC) at a compositional ratio (EC:DEC) of 2:3 on a weight basis and, thereafter, 1.0 mol/kg of $LiPF_6$ was dissolved as an electrolyte salt, was used.

In Comparative example 4-5, an electrolytic solution, in which 1 percent by weight of vinylene carbonate (VC) was added to a solvent prepared by mixing 4-fluoro-1,3-dioxolane-2-on (FEC) and diethyl carbonate (DEC) at a compositional ratio (FEC:DEC) of 2:3 on a weight basis and, thereafter, 1.0 mol/kg of $LiPF_6$ was dissolved as an electrolyte salt, was used.

In Comparative example 4-6, an electrolytic solution, in which 1 percent by weight of vinylene carbonate (VC) was added to a solvent prepared by mixing ethylene carbonate (EC), 4,5-difluoro-1,3-dioxolane-2-on (DFEC), and diethyl carbonate (DEC) at a compositional ratio (EC:DFEC:DEC) of 2:1:7 on a weight basis and, thereafter, 1.0 mol/kg of $LiPF_6$ was dissolved as an electrolyte salt, was used.

In Comparative example 4-7, an electrolytic solution, in which 0.9 mol/kg of $LiPF_6$ and 0.1 mol/kg of compound represented by Chemical formula 20 serving as electrolyte salts were dissolved into a solvent prepared by mixing ethylene carbonate (EC) and diethyl carbonate (DEC) at a compositional ratio (EC:DEC) of 2:3 on a weight basis, was used.

With respect to the prepared secondary batteries of Example 4-1 to Example 4-12 and Comparative example 4-1 to Comparative example 4-7, a charge and discharge test was performed and the high temperature preservation characteristic and the high temperature cycle characteristic were examined as in Example 1-1 to Example 1-23 and Comparative example 1-1 to Comparative example 1-7. The measurement results are shown in Table 4.

TABLE 4

Battery shape: Laminate type
Negative electrode active material: Co—Sn is contained

| | Lithium salt | | Solvent | | | | Discharge capacity maintenance factor (%) | |
| --- | --- | --- | --- | --- | --- | --- | --- | --- |
| | First compound | Second compound | Type | Type | Type | percent by weight | After high temp preservation | After high temp cycle |
| Example 4-1 | | — | | | Compound 12 | 1 | 86 | 66 |
| Example 4-2 | $LiPF_6$: 1.0 mol/kg | — | EC | DEC | Compound 12 + VC | 1 + 1 | 87 | 74 |
| Example 4-3 | | — | | | Compound 12 + SCAH | 1 + 1 | 88 | 68 |
| Example 4-4 | | — | | | Compound 12 + PRS | 1 + 1 | 88 | 69 |
| Example 4-5 | $LiPF_6$: 1.0 mol/kg | — | FEC | DEC | Compound 12 | 1 | 90 | 82 |
| Example 4-6 | | — | | | Compound 12 + VC | 1 + 1 | 92 | 83 |
| Example 4-7 | $LiPF_6$: 1.0 mol/kg | — | EC DFEC | DEC | Compound 12 | 1 | 91 | 84 |
| Example 4-8 | | — | | | Compound 12 + VC | 1 + 1 | 92 | 85 |
| Example 4-9 | $LiPF_6$: 0.9 mol/kg | Chem 20: 0.1 mol/kg | | | Compound 12 | 1 | 84 | 78 |
| Example 4-10 | $LiPF_6$: 0.9 mol/kg | Chem 25: 0.1 mol/kg | EC | DEC | Compound 12 | 1 | 88 | 82 |
| Example 4-11 | $LiPF_6$: 0.9 mol/kg | Chem 30: 0.1 mol/kg | | | Compound 12 | 1 | 88 | 66 |

TABLE 4-continued

Battery shape: Laminate type
Negative electrode active material: Co—Sn is contained

| | Lithium salt | | Solvent | | | | Discharge capacity maintenance factor (%) | |
|---|---|---|---|---|---|---|---|---|
| | First compound | Second compound | Type | Type | Type | percent by weight | After high temp preservation | After high temp cycle |
| Example 4-12 | LiPF$_6$: 0.9 mol/kg | Chem 25: 0.1 mol/kg Chem 30: 0.1 mol/kg | | | Compound 12 | 1 | 90 | 79 |
| Comparative example 4-1 | — | — | EC | DEC | — | — | 76 | 65 |
| Comparative example 4-2 | — | — | FEC | DEC | — | — | 84 | 78 |
| Comparative example 4-3 | LiPF$_6$: 1.0 mol/kg | — | EC DFEC | DEC | — | — | 86 | 80 |
| Comparative example 4-4 | — | — | EC | DEC | VC | 1 | 76 | 73 |
| Comparative example 4-5 | — | — | FEC | DEC | VC | 1 | 86 | 82 |
| Comparative example 4-6 | — | — | EC DFEC | DEC | VC | 1 | 88 | 82 |
| Comparative example 4-7 | LiPF$_6$: 0.9 mol/kg | Chem 20: 0.1 mol/kg | EC | DEC | — | — | 80 | 76 |

Chem: Chemical formula
temp: temperature

As shown in Table 4, in Example 4-1 to Example 4-12 in which an electrolytic solution containing Compound 12 was used, the high temperature preservation characteristic and the high temperature cycle characteristic were improved as compared with those of corresponding Comparative example 4-1 to Comparative example 4-7 in which the electrolytic solutions different from the electrolytic solutions of Examples merely in that Compound 12 was not contained were used. That is, in the case where the material containing cobalt-tin as a constituent element was used as the negative electrode active material, it was made clear that the high temperature characteristics were able to be improved by using the electrolytic solution containing the compound represented by Chemical formula 6.

Furthermore, in Example 4-2 in which the electrolytic solution containing vinylene carbonate (VC), besides Compound 12, was used, the high temperature preservation characteristic and the high temperature cycle characteristic were improved as compared with those of Comparative example 4-1 in which the electrolytic solution different from the electrolytic solution of Example 4-2 merely in that Compound 12 and vinylene carbonate (VC) were not contained was used. Moreover, similar results were obtained on the basis of the comparisons between Example 4-6 and Comparative example 4-2, in which the electrolytic solution containing 4-fluoro-1,3-dioxolane-2-on (FEC) was used. Similar results were obtained on the basis of the comparisons between Example 4-8 and Comparative example 4-3, in which the electrolytic solution containing 4,5-difluoro-1,3-dioxolane-2-on (DFEC) was used.

In Example 4-2, the high temperature preservation characteristic and the high temperature cycle characteristic were improved as compared with those of Example 4-1 in which the electrolytic solution different from the electrolytic solution of Example 4-2 merely in that vinylene carbonate (VC) was not contained was used and Comparative example 4-4 in which the electrolytic solution different from the electrolytic solution of Example 4-2 merely in that Compound 12 was not contained was used. Moreover, similar results were obtained on the basis of the comparisons between Example 4-6, Example 4-5, and Comparative example 4-5, in which the electrolytic solution containing 4-fluoro-1,3-dioxolane-2-on (FEC) was used. Similar results were obtained on the basis of the comparisons between Example 4-8, Example 4-7, and Comparative example 4-6, in which the electrolytic solution containing 4,5-difluoro-1,3-dioxolane-2-on (DFEC) was used. Similar tendencies were observed in the results with respect to vinylethylene carbonate (VEC).

That is, in the case where the material containing cobalt-tin as a constituent element was used as the negative electrode active material, it was made clear that further excellent high temperature characteristics were able to be exhibited by using the electrolytic solution containing the cyclic carbonic acid ester having an unsaturated bond, besides the compound represented by Chemical formula 6.

In Example 4-3, the high temperature preservation characteristic was improved as compared with that of Example 4-1 which was different from Example 4-3 merely in that SCAH was not contained. That is, in the case where the material containing cobalt-tin as a constituent element was used as the negative electrode active material, it was made clear that further excellent high temperature preservation characteristic was able to be exhibited by using the electrolytic solution containing the cyclic sultone derivative, besides the compound represented by Chemical formula 6.

In Example 4-4, the high temperature preservation characteristic and the high temperature cycle characteristic were improved as compared with those of Example 4-1 which was different from Example 4-4 merely in that PRS was not contained. That is, in the case where the material containing cobalt-tin as a constituent element was used as the negative electrode active material, it was made clear that further excellent high temperature characteristics were able to be exhibited by using the electrolytic solution containing the acid anhydride, besides the compound represented by Chemical formula 6.

When Example 4-1, Example 4-2, Example 4-5, Example 4-6, Example 4-7, and Example 4-8 were compared, it was made clear that further excellent high temperature characteristics were able to be exhibited by using the electrolytic solution further containing at least one type of 4-fluoro-1,3-dioxolane-2-on (FEC) and 4,5-difluoro-1,3-dioxolane-2-on (DFEC), besides the compound represented by Chemical formula 6. That is, in the case where the material containing cobalt-tin as a constituent element was used as the negative electrode active material, it was made clear that further excellent high temperature characteristics were able to be exhibited by using the electrolytic solution containing the compound represented by Chemical formula 10, besides the compound represented by Chemical formula 6.

In Example 4-9 to Example 4-12, the electrolytic solution containing Compound 12 and containing $LiPF_6$, which is a first compound, and a light metal salt, which is a second compound shown in Table 4, as lithium salts was used, and it was ascertained that the high temperature preservation characteristic and the high temperature cycle characteristic superior to those of Comparative example 4-1 were obtained, while the electrolytic solution used in Comparative example 4-1 was different from the electrolytic solutions of Examples merely in that Compound 12 and the second compound shown in Table 4 were not contained.

Furthermore, in Example 4-9 to Example 4-12, it was ascertained that the high temperature preservation characteristic and the high temperature cycle characteristic were able to be further improved as compared with those in Example 4-1 in which the electrolytic solution different from the electrolytic solutions of Example 4-9 to Example 4-12 merely in that the second compound shown in Table 4 was not contained as the lithium salt was used.

In Example 4-9, it was ascertained that the high temperature preservation characteristic and the high temperature cycle characteristic were able to be further improved as compared with those in Comparative example 4-7 in which the electrolytic solution different from the electrolytic solution of Example 4-9 merely in that Compound 12 was not contained.

When Example 4-9 to Example 4-12 were compared, it was ascertained that among Example 4-9 to Example 4-12, particularly excellent high temperature characteristics were able to be exhibited in Example 4-12 in which the electrolytic solution containing Compound 12, a light metal salt represented by Chemical formula 25, and a light metal salt represented by Chemical formula 30 was used.

That is, in the case where the material containing cobalt-tin as a constituent element was used as the negative electrode active material, it was made clear that further excellent high temperature characteristics were able to be exhibited by using the electrolytic solution containing at least one type of the light metal salt represented by Chemical formula 12 and the light metal salt represented by Chemical formula 28, besides the compound represented by Chemical formula 6. Furthermore, it was made clear that particularly excellent high temperature characteristics were able to be exhibited by using the electrolytic solution containing both the light metal salt represented by Chemical formula 12 and the light metal salt represented by Chemical formula 28, besides the compound represented by Chemical formula 6.

In the case where the material containing cobalt-tin as a constituent element was used as the negative electrode active material as well, it is preferable that the content of the compound represented by Chemical formula 6 is 0.01 percent by weight or more, and less than 5 percent by weight, as in the case where the carbon material, the lithium metal, or silicon (Si) are used for the negative electrode.

When a battery is prepared as in the above-described Examples by using an electrolytic solution containing the compound represented by (7-52) of Chemical formula 7 in place of Compound 12, and the high temperature preservation characteristic and the high temperature cycle characteristic were measured and compared, the use of the electrolytic solution containing Compound 12 tends to exhibit excellent high temperature preservation characteristic and excellent high temperature cycle characteristic as compared with those of the use of the electrolytic solution containing the compound represented by (7-52) of Chemical formula 7. Consequently, it is clear that excellent high temperature characteristics tend to be exhibited by using the electrolytic solution containing the compound represented by Chemical formula 8 among the compounds represented by Chemical formula 6.

In the above-described Examples, the electrolytic solutions are used. However, similar results may be obtained when a gel-like electrolyte is used.

As described above, according to the embodiments, with respect to the negative electrodes, in general, the high temperature characteristics may be improved by using the electrolyte containing at least one type of compound represented by Chemical formula 6. With respect to negative electrodes, in general, further excellent high temperature characteristics may be exhibited by using the electrolyte containing the cyclic carbonic acid ester having an unsaturated bond, besides the compound represented by Chemical formula 6. With respect to negative electrodes, in general, further excellent high temperature characteristics may be exhibited by using the electrolyte containing the compound represented by Chemical formula 10, besides the compound represented by Chemical formula 6. With respect to negative electrodes, in general, it is preferable that the content of the compound represented by Chemical formula 6 is 0.01 percent by weight or more, and less than 5 percent by weight relative to the solvent from the view point of exhibition of further excellent high temperature characteristics. With respect to negative electrodes, in general, further excellent high temperature characteristics may be exhibited by using the electrolytic solution containing at least one type of the light metal salt represented by Chemical formula 12 and the light metal salt represented by Chemical formula 28, besides the compound represented by Chemical formula 6. Furthermore, particularly excellent high temperature characteristics may be exhibited by using the electrolytic solution containing both the light metal salt represented by Chemical formula 12 and the light metal salt represented by Chemical formula 28, besides the compound represented by Chemical formula 6. Moreover, excellent high temperature characteristics tend to be exhibited by using the electrolytic solution containing the compound represented by Chemical formula 8 among the compounds represented by Chemical formula 6.

In the case where the carbon material is used for the negative electrode or in the case where the material containing silicon (Si) as a constituent element is used for the negative electrode, in particular, the ambient temperature cycle characteristic may also be improved by using the electrolytic solution containing the compound represented by Chemical formula 6.

A method for manufacturing an electrolyte according to another embodiment will be specifically described with reference to Examples.

Example 5-1

A 500-ml PFA flask provided with a mechanical stirrer, a fluorine introduction tube, and an exhaust tube was charged with 1.01 g (8.41 mmol) of 1,3-dithiolane-2-on and 20 ml of acetonitrile, and nitrogen substitution of the inside of the system was performed for 1 hour. Thereafter, a fluorine gas diluted to 10% with a nitrogen gas was passed at 60 cm$^3$/min so as to perform a reaction through agitation at room temperature for 31 minutes.

After the reaction was completed, the reaction solution was sampled and neutralized with sodium hydrogencarbonate. According to the analysis with gas chromatography/mass spectrometry (GC/MS), the degree of reaction of 1,3-dithiolane-2-on was 50%. The main product was a monofluorinated material, in which fluorine (F) substituted for any one of hydrogen (H) of a methylene group of 1,3-dithiolane-2-on, having a molecular weight of 138, and the yield thereof was 25% relative to the entire. Furthermore, generation of 1,3-dithiol-2-on, which is an unsaturated compound, was also ascertained, and the yield thereof was 10% relative to the entire. Generation of several types of other high molecular weight byproducts was also ascertained.

Example 5-2

The reaction time was extended to 62 minutes under the same condition as that of Example 5-1. According to GC/MS analysis, the degree of reaction of 1,3-dithiolane-2-on was 85%. The main product was a monofluorinated material, in which fluorine (F) substituted for any one of hydrogen (H) of a methylene group of 1,3-dithiolane-2-on, having a molecular weight of 138, and the yield thereof was 25% relative to the entire. Furthermore, generation of 1,3-dithiol-2-on, which is an unsaturated compound, was also ascertained. However, the yield thereof was reduced as compared with that in Example 5-1 and was 6% relative to the entire. Moreover, generation of two types of difluorinated materials and many types of other high molecular weight byproducts was also ascertained.

Example 5-3

The reaction time was extended to 93 minutes under the same condition as that of Example 5-1. According to GC/MS analysis, the degree of reaction of 1,3-dithiolane-2-on was 99%. The main product was a monofluorinated material, in which fluorine (F) substituted for any one of hydrogen (H) of a methylene group of 1,3-dithiolane-2-on, having a molecular weight of 138, and the yield thereof was 12% relative to the entire. Furthermore, two types of difluorinated materials were generated, and the respective yields were 8% and 4% relative to the entire. Generation of 1,3-dithiol-2-on, which is an unsaturated compound, was also ascertained. However, the yield thereof was reduced as compared with that in Example 5-1 and was 5% relative to the entire. Moreover, generation of many types of other high molecular weight byproducts was also ascertained.

Example 5-4

A 1,000-ml PFA flask provided with a mechanical stirrer, a fluorine introduction tube, and an exhaust tube was charged with 29.56 g (0.246 mol) of 1,3-dithiolane-2-on and 300 ml of acetonitrile, and nitrogen substitution of the inside of the system was performed for 1 hour. Thereafter, a fluorine gas diluted to 10% with a nitrogen gas was passed at 60 cm$^3$/min so as to perform a reaction through agitation at room temperature for 26 minutes. The reaction solution was sampled and neutralized with sodium hydrogencarbonate. According to the analysis with gas chromatography, the main product was a monofluorinated material, in which fluorine (F) substituted for any one of hydrogen (H) of a methylene group of 1,3-dithiolane-2-on, having a molecular weight of 138, and the yield thereof was 43% relative to the entire. Furthermore, 15% of 1,3-dithiol-2-on, which is an unsaturated compound, was also generated. The remainder was unreacted 1,3-dithiolane-2-on. The reaction solution was blended with 250 ml of pure water, and products were extracted with diethyl ether, followed by cleaning with water three times.

Diethyl ether was distilled away, and refining was performed with column chromatography (SiO$_2$, hexane:ethyl acetate mixed solvent 8:1), so as to isolate 350 g of 4-fluoro-1,3-dithiolane-2-on. Isolated 4-fluoro-1,3-dithiolane-2-on had a purity of 99 GC %, and exhibited spectrum data of $^1$H-NMR (CDCl$_3$) 6.67 ppm, 4.15 ppm, 4.01 ppm, $^{19}$F-NMR (CDCl$_3$) 69.9 ppm.

At the same time, 0.95 g of 1,3-dithiol-2-on was also isolated. The isolated 1,3-dithiol-2-on had a purity of 99 GC %, and exhibited spectrum data of $^1$H-NMR (CDCl$_3$) 6.76 ppm, $^{13}$C-NMR (CDCl$_3$) 194.2 ppm, 118.6 ppm.

Example 5-5

A 500-ml PFA flask provided with a mechanical stirrer, a fluorine introduction tube, and an exhaust tube was charged with 10.0 g (96 mmol) of 1,3-oxathiolane-2-on and 100 ml of acetonitrile, and substitution was performed with 200 sccm of nitrogen for 2 hours. A mixed gas of 5 sccm of fluorine and 45 sccm of nitrogen was introduced for 20 hours through agitation. The reaction solution was blended with 100 ml of diethyl ether, and an organic layer was cleaned twice with saturated saline water. After the organic layer was dried with magnesium sulfate, measurement was performed with GC/MS and, thereby, it was ascertained that the main products were two types of monofluorinated materials in which fluorine (F) substituted for any one of hydrogen (H) of a methylene group of 1,3-oxathiolane-2-on. Furthermore, three types of difluorinated materials were also ascertained, but the amount of production was small. Moreover, polymer-like high molecular weight byproducts was also ascertained.

The resulting product was refined with column chromatography (SiO$_2$, hexane:ethyl acetate mixed solvent 8:1), so as to isolate 0.85 g of 4-fluoro-1,3-oxathiolane-2-on. Isolated 4-fluoro-1,3-oxathiolane-2-on exhibited spectrum data of $^1$H-NMR (CDCl$_3$) 6.60 ppm, 4.82 ppm, 4.60 ppm, $^{19}$F-NMR (CDCl$_3$) 67.4 ppm.

The characteristics of a battery including the electrolyte prepared by the method for manufacturing an electrolyte according to the present embodiment of the application were evaluated. The battery was prepared as described below. In the following description, Compound 31, Compound 32, and Compound 33 refer to the compounds represented by the following (45-1) to (45-3), respectively, of Chemical formula 45.

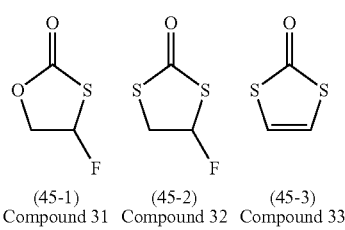

Chemical formula 45

(45-1) Compound 31   (45-2) Compound 32   (45-3) Compound 33

Example 6-1

A positive electrode mix was prepared by mixing 91 parts by mass of lithium cobalt compound oxide ($LiCoO_2$), 6 parts by mass of graphite serving as an electrically conductive agent, and 3 parts by mass of polyvinylidene fluoride serving as a binder.

A positive electrode mix slurry was prepared by dispersing the resulting positive electrode mix into N-methyl-2-pyrrolidone serving as a solvent, and was applied uniformly to both surfaces of a positive electrode collector 21A composed of band-shaped aluminum foil having a thickness of 12 μm, followed by drying. A positive electrode active material layer 21B was formed by compaction molding with a roll press machine, and a positive electrode 21 was prepared. Thereafter, an aluminum positive electrode lead 25 was attached to one end of the positive electrode collector 21A.

A negative electrode mix was prepared by mixing 90 parts by mass of artificial graphite powder and 10 parts by mass of polyvinylidene fluoride serving as a binder. A negative electrode mix slurry was prepared by dispersing the resulting negative electrode mix into N-methyl-2-pyrrolidone serving as a solvent, and was applied uniformly to both surfaces of a negative electrode collector 22A composed of band-shaped copper foil having a thickness of 15 μm, followed by drying. A negative electrode mix layer 22B was formed by compaction molding with a roll press machine, and a negative electrode 22 was prepared.

After each of the positive electrode 21 and the negative electrode 22 was prepared, a separator 23 composed of a fine porous film was prepared, and the negative electrode 22, the separator 23, the positive electrode 21, and the separator 23 were laminated in that order. The resulting laminate was rolled a plurality of times into a spiral shape, so that a Jelly roll type rolled electrode component 20 was prepared.

After the rolled electrode component 20 was prepared, the rolled electrode component 20 was sandwiched between a pair of insulating plate 12 and insulating plate 13. A negative electrode lead 26 was welded to a battery case 11, the positive electrode lead 25 was welded to a safety valve mechanism 15, and the rolled electrode component 20 was stored into the inside of the iron battery case 11 plated with nickel. Subsequently, an electrolytic solution was injected into the inside of the battery case 11 by a reduced pressure system.

An electrolytic solution, in which a solvent was prepared by mixing ethylene carbonate and dimethyl carbonate at a weight ratio of 2:3, 1.0 mol/kg of $LiPF_6$ was dissolved as an electrolyte salt, and 1 percent by weight of Compound 31 was further added, was used.

A battery lid 14 was attached to the battery case 11 by swaging with a gasket 17 therebetween. In this manner, a cylindrical battery having a diameter of 18 mm and a height of 65 mm of Example 6-1 was prepared.

Example 6-2

A battery of Example 6-2 was prepared as in Example 6-1 except that Compound 32 was used as the additive.

Example 6-3

A battery of Example 6-3 was prepared as in Example 6-1 except that Compound 33 was used as the additive.

Example 6-4

A battery of Example 6-4 was prepared as in Example 6-1 except that $LiCO_{1/3}Ni_{1/3}Mn_{1/3}O$ was used as the positive electrode material.

Example 6-5

A battery of Example 6-5 was prepared as in Example 6-1 except that $LiCO_{1/3}Ni_{1/3}Mn_{1/3}O$ was used as the positive electrode material and Compound 32 was used as the additive.

Example 6-6

A battery of Example 6-6 was prepared as in Example 6-1 except that $LiCO_{1/3}Ni_{1/3}Mn_{1/3}O$ was used as the positive electrode material and Compound 33 was used as the additive.

Example 6-7

A battery of Example 6-7 was prepared as in Example 6-1 except that $LiNiO_2$ was used as the positive electrode material.

Example 6-8

A battery of Example 6-8 was prepared as in Example 6-1 except that $LiNiO_2$ was used as the positive electrode material and Compound 32 was used as the additive.

Example 6-9

A battery of Example 6-9 was prepared as in Example 6-1 except that $LiNiO_2$ was used as the positive electrode material and Compound 33 was used as the additive.

Comparative Example 6-1

A battery of Comparative example 6-1 was prepared as in Example 6-1 except that Compound 31 was not added.

Comparative Example 6-2

A battery of Comparative example 6-2 was prepared as in Example 6-4 except that Compound 31 was not added.

Comparative Example 6-3

A battery of Comparative example 6-3 was prepared as in Example 6-7 except that Compound 31 was not added.

Subsequently, with respect to the batteries of Example 6-1 to Example 6-9 and Comparative example 6-1 to Comparative example 6-3, a charge and discharge test was performed. Two cycles of charge and discharge were performed at 23° C., and the discharge capacity in the 2nd cycle (the discharge capacity in the 2nd cycle at 23° C.) was determined. Furthermore, 200 cycles of charge and discharge were performed at 23° C., and the discharge capacity in the 202nd cycle was determined. At that time, with respect to the charge, constant-current constant-voltage charge of 0.2 C was performed up to an upper limit voltage of 4.2 V. With respect to the discharge, constant-current discharge of 0.2 C was performed up to a final voltage of 2.5 V. With respect to the cycle characteristic, the ratio of the discharge capacity in the 202nd cycle to the discharge capacity in the 2nd cycle, that is, (discharge capacity in the 202nd cycle/discharge capacity in the 2nd cycle)× 100%, was determined and evaluated. The measurement results are shown in Table 5.

TABLE 5

| | Positive electrode | Negative electrode | LiPF$_6$ | Solvent | Additive | percent by weight | Ambient temperature cycle Discharge capacity maintenance factor (%) |
|---|---|---|---|---|---|---|---|
| Example 6-1 | LiCoO$_2$ | | | | Compound 31 | 1 | 88 |
| Example 6-2 | LiCoO$_2$ | | | | Compound 32 | 1 | 88 |
| Example 6-3 | LiCoO$_2$ | | | | Compound 33 | 1 | 87 |
| Example 6-4 | LiCo$_{1/3}$Ni$_{1/3}$Mn$_{1/3}$O | artificial graphite | 1.0 mol/kg | EC:DMC = 2:3 (weight ratio) | Compound 31 | 1 | 86 |
| Example 6-5 | LiCo$_{1/3}$Ni$_{1/3}$Mn$_{1/3}$O | | | | Compound 32 | 1 | 85 |
| Example 6-6 | LiCo$_{1/3}$Ni$_{1/3}$Mn$_{1/3}$O | | | | Compound 33 | 1 | 86 |
| Example 6-7 | LiNiO$_2$ | | | | Compound 31 | 1 | 87 |
| Example 6-8 | LiNiO$_2$ | | | | Compound 32 | 1 | 85 |
| Example 6-9 | LiNiO$_2$ | | | | Compound 33 | 1 | 86 |
| Comparative example 6-1 | LiCoO$_2$ | | | EC:DMC = 2:3 (weight ratio) | None | — | 79 |
| Comparative example 6-2 | LiCo$_{1/3}$Ni$_{1/3}$Mn$_{1/3}$O | artificial graphite | 1.0 mol/kg | | None | — | 81 |
| Comparative example 6-3 | LiNiO$_2$ | | | | None | — | 80 |

As shown in Table 5, in Example 6-1 to Example 6-9, the discharge capacity maintenance factors were larger than those of Comparative example 6-1 to Comparative example 6-3 which were different from Examples merely in that Compound 31, Compound 32, and Compound 33 were not contained as an additive. That is, it was made clear that the battery characteristics were able to be improved by using the electrolyte prepared by the manufacturing method according to an embodiment.

Up to this point, the present application has been described with reference to embodiments and examples. However, the present application is not limited to the above-described embodiments and examples, and may be variously modified. For example, in the above-described embodiments and examples, the secondary battery having the rolled structure has been specifically described. However, the present application may also be applied to a secondary battery having a rectangular type, a sheet type, or a card type structure or a secondary battery having a laminated structure in which a plurality of positive electrodes and negative electrodes are laminated. Furthermore, the present application may be applied to not only secondary batteries, but also other batteries, e.g., primary batteries.

In the above-described embodiments, the cylindrical battery and the battery including the laminate film as the outer jacket component have been described as examples, although not limited to them. For example, the present application may be applied to nonaqueous electrolyte batteries having various shapes and sizes, e.g., batteries of coin type, rectangular type, button type, and the like, batteries in which metal container and the like are used as the outer jacket component, and low profile batteries.

Moreover, similar effects may be exerted by an electrolytic solution containing a compound represented by, for example, Chemical formula 46, that is, a compound represented by Chemical formula 6 in which a halogen element has substituted for fluorine (F), and a nonaqueous electrolyte battery including the above-described electrolytic solution.

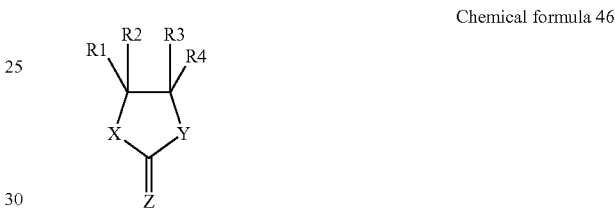

Chemical formula 46 where R1, R2, R3, and R4 independently represent a hydrogen group, a halogen group, a methyl group, an ethyl group, or a group in which a halogen group has substituted for a part of the methyl group or the ethyl group; at least one of R1, R2, R3, and R4 is a group containing a halogen; and X, Y, and Z independently represent sulfur (S) or oxygen (O) except the case in which all of X, Y, and Z are oxygen (O), that is, X=Y=Z=O.

In the above-described embodiments and examples, the case where lithium (Li) is used as the electrode reaction material has been described. The present application may be applied to the case where other group 1 elements, e.g., sodium (Na) and potassium (K), in the long-period form of the periodic table; group 2 elements, e.g., magnesium (Mg) and calcium (Ca), in the long-period form of the periodic table; other light metals, e.g., aluminum (Al); lithium (Li); and alloys thereof are used, and similar effects may be exerted. At that time, the negative electrode materials described in the embodiments may be similarly used as the negative electrode active materials.

It should be understood by those skilled in the art that various modifications, combinations, sub-combinations and alterations may occur depending on design requirements and other factors insofar as they are within the scope of the appended claims or the equivalents thereof.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. An electrolyte comprising at least one type of compound represented by the following formula:

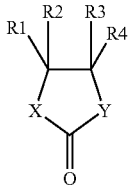

where at least one of X and Y is sulfur (S); R1, R2, R3 and R4 independently represent a hydrogen group, a fluorine group, a methyl group, an ethyl group, or a group in which a fluorine group has substituted for a part of the methyl group or the ethyl group; at least one of R1, R2, R3, and R4 is a group containing fluorine (F); and, X and Y independently represent sulfur (S) or oxygen (O).

2. The electrolyte according to claim 1, wherein the content of the compound is 0.01 percent by weight or more, and less than 5 percent by weight relative to a solvent.

3. The electrolyte according to claim 1, further comprising a cyclic carbonic acid ester compound having an unsaturated bond.

4. The electrolyte according to claim 1, further comprising a cyclic sultone derivative.

5. The electrolyte according to claim 1, further comprising an acid anhydride.

6. The electrolyte according to claim 1, further comprising at least one type of compound represented by the following formula:

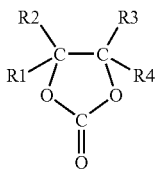

where R1, R2, R3, and R4 independently represent a hydrogen group, a halogen group, a methyl group, an ethyl group, or a group in which a halogen group has substituted for a part of hydrogen of the methyl group or the ethyl group; and at least one of R1, R2, R3, and R4 is a group containing a halogen.

7. The electrolyte according to claim 1, further comprising at least one type of 4-fluoro-1,3-dioxolane-2-on and 4,5-difluoro-1,3-dioxolane-2-on.

8. The electrolyte according to claim 1, further comprising at least one type of light metal salt represented by the following formula:

where R11 represents a —C(=O)—R21—C(=O)— group, a —C(=O)—C(R23)(R24)— group, or a —C(=O)—C(=O)— group; R12 represents a halogen group, an alkyl group, a halogenated alkyl group, an aryl group, or a halogenated aryl group; R21 represents an alkylene group, a halogenated alkylene group, an arylene group, or a halogenated arylene group; R23 and R24 independently represent an alkyl group, a halogenated alkyl group, an aryl group, or a halogenated aryl group; X11 and X12 independently represent oxygen (O) or sulfur (S); M11 represents a transition metal element or a group 3B element, group 4B element, or group 5B element in the short-period form of the periodic table; M21 represents a group 1A element or group 2A element in the short-period form of the periodic table or aluminum (Al); a represents an integer of 1 to 4; b represents an integer of 0 to 8; and c, d, e, and f independently represent an integer of 1 to 3.

9. The electrolyte according to claim 1, further comprising at least one type of light metal salt represented by the following formula:

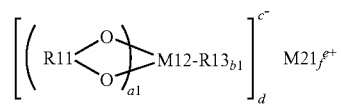

where R11 represents a —C(=O)—R21—C(=O)— group, a —C(=O)—C(=O)— group, or a —C(=O)—C—(R22)$_2$— group; R13 represents a halogen; R21 represents an alkylene group, a halogenated alkylene group, an arylene group, or a halogenated arylene group; R22 represents an alkyl group, a halogenated alkyl group, an aryl group, or a halogenated aryl group; M12 represents phosphorous (P) or boron (B); M21 represents a group 1A element or group 2A element in the short-period form of the periodic table or aluminum (Al); a1 represents an integer of 1 to 4; b1 represents 0, 2, or 4; and c, d, e, and f independently represent an integer of 1 to 3.

10. The electrolyte according to claim 1, further comprising at least one type of light metal salt selected from the group consisting of
difluoro[oxolate-O,O']lithium borate,
difluorobis[oxolate-O,O']lithium phosphate,
difluoro [3,3,3-trifluoro-2-oxide-2-trifluoromethylpropionate(2-)-O,O']lithium borate,
bis[3,3,3-trifluoro-2-oxide-2-trifluoromethylpropionate (2-)-O,O']lithium borate,
tetrafluoro[oxolate-O,O']lithium phosphate, and
bis[oxolate-O,O']lithium borate, represented by the following formulae, respectively:

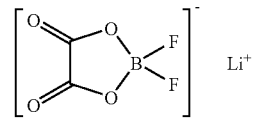

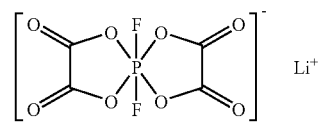

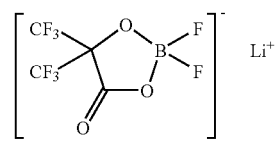

-continued

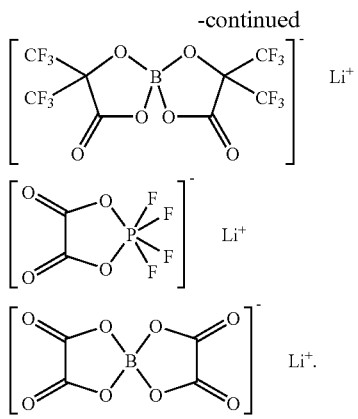

11. The electrolyte according to claim 1, further comprising at least one type selected from the group consisting of LiPF$_6$, LiBF$_4$, LiClO$_4$, LiAsF$_6$, and lithium salts represented by the following formulae:

$$\text{LiN}(C_mF_{2m+1}SO_2)(C_nF_{2n+1}SO_2)$$

where m and n independently represent an integer of 1 or more,

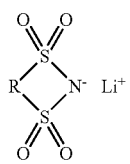

where R represents a straight chain or branched perfluoroalkylene group having the carbon number of 2 to 4, and $$\text{LiC}(C_pF_{2p+1}SO_2)(C_qF_{2q+1}SO_2)(C_rF_{2r+1}SO_2)$$

where p, q, and r independently represent an integer of 1 or more.

12. A battery comprising:
a positive electrode;
a negative electrode; and
an electrolyte,
wherein the electrolyte contains at least one type of compound represented by the following formula,

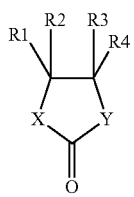

where at least one of X and Y is sulfur (S); R1, R2, R3 and R4 independently represent a hydrogen group, a fluorine group, a methyl group, an ethyl group, or a group in which a fluorine group has substituted for a part of the methyl group or the ethyl group; at least one of R1, R2, R3, and R4 is a group containing fluorine (F); and, X and Y independently represent sulfur (S) or oxygen (O).

13. The battery according to claim 12, wherein the content of the compound is 0.01 percent by weight or more, and less than 5 percent by weight relative to a solvent.

14. The battery according to claim 12, wherein the electrolyte further comprises a cyclic sultone derivative.

15. The battery according to claim 12, wherein the electrolyte further comprises an acid anhydride.

16. The battery according to claim 12, wherein the electrolyte further comprises a cyclic carbonic acid ester compound having an unsaturated bond.

17. The battery according to claim 12, wherein the electrolyte further comprises at least one type of compound represented by the following formula:

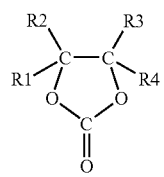

where R1, R2, R3, and R4 independently represent a hydrogen group, a halogen group, a methyl group, an ethyl group, or a group in which a halogen group has substituted for a part of hydrogen of the methyl group or the ethyl group; and at least one of R1, R2, R3, and R4 is a group containing a halogen.

18. The battery according to claim 12, wherein the electrolyte further comprises at least one type of 4-fluoro-1,3-dioxolane-2-on and 4,5-difluoro-1,3-dioxolane-2-on.

19. The battery according to claim 12, wherein the electrolyte further comprises at least one type of light metal salt represented by the following formula:

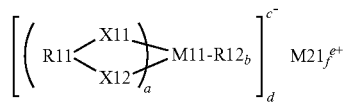

where R11 represents a —C(=O)—R21—C(=O)— group, or a —C(=O)—C(=O)— group; R12 represents a halogen group, an alkyl group, a halogenated alkyl group, an aryl group, or a halogenated aryl group; R21 represents an alkylene group, a halogenated alkylene group, an arylene group, or a halogenated arylene group; R23 and R24 independently represent an alkyl group, a halogenated alkyl group, an aryl group, or a halogenated aryl group; X11 and X12 independently represent oxygen (O) or sulfur (S); M11 represents a transition metal element or a group 3B element, group 4B element, or group 5B element in the short-period form of the periodic table; M21 represents a group 1A element or group 2A element in the short-period form of the periodic table or aluminum (Al); a represents an integer of 1 to 4; b represents an integer of 0 to 8; and c, d, e, and f independently represent an integer of 1 to 3.

20. The battery according to claim 12, wherein the electrolyte further comprises at least one type of light metal salt represented by the following formula:

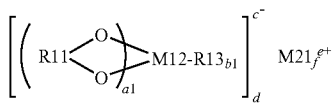

where R11 represents a —C(=O)—R21—C(=O)— group, a —C(=O)—C(=O)— group, or a —C(=O)—C—(R22)$_2$— group; R13 represents a halogen; R21 represents an alkylene group, a halogenated alkylene group, an arylene group, or a halogenated arylene group; R22 represents an alkyl group, a halogenated alkyl group, an aryl group, or a halogenated aryl group; M12 represents phosphorous (P) or boron (B); M21 represents a group 1A element or group 2A element in the short-period form of the periodic table or aluminum (Al); a1 represents an integer of 1 to 4; b1 represents 0, 2, or 4; and c, d, e, and f independently represent an integer of 1 to 3.

21. The battery according to claim 12, wherein the electrolyte further comprises at least one type of light metal salt selected from the group consisting of difluoro[oxolate-O,O']lithium borate, difluorobis[oxolate-O,O']lithium phosphate, difluoro[3,3,3-trifluoro-2-oxide-2-trifluoromethylpropionate(2-)-O,O']lithium borate, bis[3,3,3-trifluoro-2-oxide-2-trifluoromethylpropionate(2-)-O,O']lithium borate, tetrafluoro[oxolate-O,O']lithium phosphate, and bis[oxolate-O,O']lithium borate, represented by the following formulae, respectively:

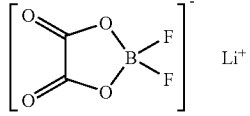

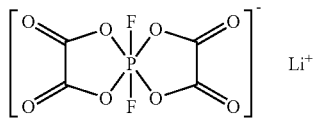

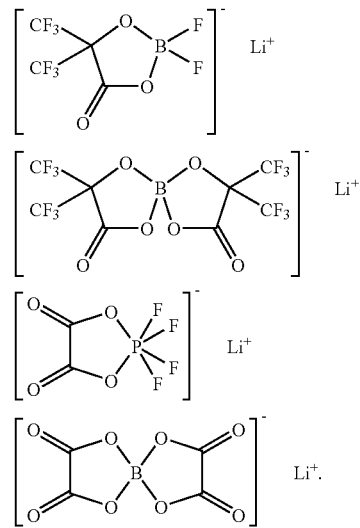

22. The battery according to claim 12, wherein the electrolyte further comprises at least one type selected from the group consisting of LiPF$_6$, LiBF$_4$, LiClO$_4$, LiAsF$_6$, and lithium salts represented by the following formulae:

LiN(C$_m$F$_{2m+1}$SO$_2$)(C$_n$F$_{2n+1}$SO$_2$)

where m and n independently represent an integer of 1 or more,

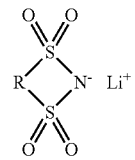

where R represents a straight chain or branched perfluoroalkylene group, and

LiC(C$_p$F$_{2p+1}$SO$_2$)(C$_q$F$_{2q+1}$SO$_2$)(C$_r$F$_{2r+1}$SO$_2$)

where p, q, and r independently represent an integer of 1 or more.

* * * * *